US008532801B2

(12) United States Patent
Kuwaoka

(10) Patent No.: US 8,532,801 B2
(45) Date of Patent: Sep. 10, 2013

(54) METHOD AND APPARATUS FOR PROCESSING DIGITAL AUDIO SIGNAL AND RELATED COMPUTER PROGRAM

(75) Inventor: Toshiharu Kuwaoka, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 1804 days.

(21) Appl. No.: 11/882,569

(22) Filed: Aug. 2, 2007

(65) Prior Publication Data

US 2008/0082189 A1 Apr. 3, 2008

(30) Foreign Application Priority Data

Oct. 2, 2006 (JP) ................................ 2006-271293
Mar. 28, 2007 (JP) ................................ 2007-086005

(51) Int. Cl.
*G06F 17/00* (2006.01)
*G10L 19/00* (2013.01)
*G10H 1/06* (2006.01)

(52) U.S. Cl.
USPC ................................ 700/94; 704/500; 84/622

(58) Field of Classification Search
USPC .............................. 700/94; 84/622; 704/500
See application file for complete search history.

(56) References Cited

U.S. PATENT DOCUMENTS 6,449,519 B1 * 9/2002 Kuwaoka ........................ 700/94
2002/0075777 A1 * 6/2002 Kuwaoka .................. 369/47.35
2003/0236584 A1 12/2003 Kuwaoka

FOREIGN PATENT DOCUMENTS

JP 3659489 3/2005
JP 2004-021224 1/2007

* cited by examiner

*Primary Examiner* — Davetta W Goins
*Assistant Examiner* — Daniel Sellers
(74) *Attorney, Agent, or Firm* — Louis Woo

(57) ABSTRACT

Every extreme value in an audio waveform represented by a digital audio signal having a sequence of samples is detected. A number of samples between samples corresponding to the first and second latest extreme values is detected. A corrective value is generated in response to the detected sample number and a difference between the first and second latest extreme values. Ones are designated among samples in response to the detected sample number. The designated samples include at least (1) a sample adjacently following the sample corresponding to the second latest extreme value, (2) a sample adjacently preceding the sample corresponding to the first latest extreme value, and (3) one of the sample corresponding to the first latest extreme value and the sample corresponding to the second latest extreme value. The designated samples are corrected in response to at least one of current, previous, and feature corrective values.

20 Claims, 11 Drawing Sheets

| INTER-EXTREME SAMPLE NUMBER | COEFFICIENT | CORRECTION SAMPLE NUMBER |
|---|---|---|
| ⋮ | ⋮ | ⋮ |
| 4 | 1/32 | 1 |
| 5 | 1/16 | 1 |
| 6 | 1/14 | 5 (=2+3) |
| 7 | 1/8 | 9 (=4+5) |
| ⋮ | ⋮ | ⋮ |

METHOD AND APPARATUS FOR PROCESSING DIGITAL AUDIO SIGNAL AND RELATED COMPUTER PROGRAM

BACKGROUND OF THE INVENTION

1. Field of the Invention

This invention relates to a method, an apparatus, and a computer program for processing a digital audio signal to improve a related audio quality.

2. Description of the Related Art

In some cases, an analog audio signal is digitized at a prescribed sampling frequency and a prescribed quantization bit number. During the digitizing, signal components having frequencies equal to or higher than a half of the sampling frequency are cut off, and quantization errors occur depending on the quantization bit number. The cutoff of the high-frequency signal components, and the quantization errors cause a reduction in audio quality related to the resultant digital audio signal.

Japanese patent number 3659489 discloses a method of processing a digital audio signal to improve a related audio quality. The digital audio signal has a sequence of samples. In the method of Japanese patent 3659489, a periodically-updated current sample of the digital audio signal and an immediately-preceding sample thereof are compared to detect every local maximum value and every local minimum value of the waveform represented by the digital audio signal. Detection is made as to the number of samples between the position of the occurrence of every local maximum value and the position of the occurrence of a subsequent local minimum value, and the number of samples between the position of the occurrence of every local minimum value and the position of the occurrence of a subsequent local maximum value. Calculation is made as to the difference between every local maximum value and a value represented by a sample immediately-preceding the sample corresponding to the local maximum value, and the difference between every local minimum value and a value represented by a sample immediately-preceding the sample corresponding to the local minimum value. Coefficients are determined in accordance with the detected sample numbers by referring to a coefficient table. The calculated differences and the determined coefficients are multiplied to get a first multiplication result for every local maximum value and a second multiplication result for every local minimum value. The first multiplication result is added to every local maximum value. The second multiplication result is subtracted from the every local minimum value. As a result of the addition and the subtraction, the digital audio signal is corrected.

Japanese patent application publication number 2004-21224 corresponding to US patent application publication number US-2003/0236584 A1 discloses a method of processing a digital audio signal to improve a related audio quality. The digital audio signal has a sequence of samples. In the method of Japanese application 2004-21224, extreme values in an audio waveform represented by the digital audio signal are detected. The extreme values include maximum values and minimum values. An audio frequency represented by the digital audio signal is detected in response to the number of samples between two temporally-adjacent extreme-corresponding samples. A difference between each extreme value and a value of a sample which immediately precedes the present extreme-corresponding sample is calculated. The calculated differences are multiplied by selected one of predetermined coefficients to get corrective values respectively. A decision is made as to whether or not the detected audio frequency is in one selected from predetermined frequency bands. When the detected audio frequency is in the selected frequency band, a corresponding corrective value is added to the maximum value and a corresponding corrective value is subtracted from the minimum value. As a result of the addition and the subtraction, the digital audio signal is corrected.

Usual digital audio signals transmitted in digital television broadcasting or through the Internet result from encoding inclusive of lossy compression that cuts off high-frequency signal components. Examples of such compressively encoding are AAC (Advanced Audio Coding) and MP3. In AAC used by digital television broadcasting, signal components having frequencies of 16 kHz or higher are cut off. On the other hand, MP3 used by portable terminals cuts off signal components having frequencies of 8 kHz or higher. In the case where the method in Japanese patent 3659489 or Japanese application 2004-21224 is applied to the processing of such a compressed digital audio signal (for example, an AAC signal or an MP3 signal), the cut-off of high-frequency signal components can not be sufficiently compensated for. Therefore, a correction-resultant digital audio signal generated by the method tend to appreciably differ from an original analog or digital audio signal in audio quality.

There is a recording medium which stores an analog audio signal recorded many years ago. Generally, the analog audio signal currently reproduced from the recording medium is considerably lower in audio quality than the analog audio signal occurring at the time of the recording. In the case where the method in Japanese patent 3659489 or Japanese application 2004-21224 is applied to the processing of a PCM signal generated by conversion of the currently-reproduced analog audio signal, since only signal samples corresponding to respective extreme values (maximum values and minimum values) are corrected, a correction-resultant digital audio signal appreciably differs in audio quality from the analog audio signal occurring at the time of the recording.

There is an analog audio signal resulting from repetitively dubbing. Generally, the present analog audio signal is considerably lower in audio quality than the original analog audio signal. In the case where the method in Japanese patent 3659489 or Japanese application 2004-21224 is applied to the processing of a PCM signal generated by conversion of the present analog audio signal, since only signal samples corresponding to respective extreme values (maximum values and minimum values) are corrected, a correction-resultant digital audio signal appreciably differs in audio quality from the original analog audio signal.

SUMMARY OF THE INVENTION

It is a first object of this invention to provide a method of processing a digital audio signal which can make a related audio quality close to that of an original audio signal.

It is a second object of this invention to provide an apparatus for processing a digital audio signal which can make a related audio quality close to that of an original audio signal.

It is a third object of this invention to provide a computer program for processing a digital audio signal which can make a related audio quality close to that of an original audio signal.

A first aspect of this invention provides a method of processing a digital audio signal having a sequence of samples. The method comprises the steps of detecting every extreme value in an audio waveform represented by the digital audio signal, the extreme value being either a maximum value or a minimum value; detecting a number of samples between samples corresponding to the first and second latest detected extreme values to get a detected inter-extreme sample number; calculating a difference between the first and second latest detected extreme values to get a calculated inter-extreme difference; generating a corrective value in response to the detected inter-extreme sample number and the calculated inter-extreme difference, the generated corrective value being updated each time a new extreme value is detected; designating ones among samples in response to the detected inter-extreme sample number as objects to be corrected, the designated samples including at least (1) a sample adjacently following the sample corresponding to the second latest detected extreme value, (2) a sample adjacently preceding the sample corresponding to the first latest detected extreme value, and (3) one of the sample corresponding to the first latest detected extreme value and the sample corresponding to the second latest detected extreme value; and correcting the designated samples in response to at least one of (1) the currently-generated corrective value, (2) the previously-generated corrective value, and (3) a generated corrective value next to the currently-generated corrective value.

A second aspect of this invention is based on the first aspect thereof, and provides a method wherein the correcting is such that one of (1) the currently-generated corrective value, (2) the previously-generated corrective value, and (3) the generated corrective value next to the currently-generated corrective value is subtracted from a value of the sample adjacently following the sample corresponding to the second latest detected extreme value and one of (1) the currently-generated corrective value, (2) the previously-generated corrective value, and (3) the generated corrective value next to the currently-generated corrective value is added to a value of the sample adjacently preceding the sample corresponding to the first latest detected extreme value when the first and second latest detected extreme values are a maximum value and a minimum value respectively, and that one of (1) the currently-generated corrective value, (2) the previously-generated corrective value, and (3) the generated corrective value next to the currently-generated corrective value is added to the value of the sample adjacently following the sample corresponding to the second latest detected extreme value and one of (1) the currently-generated corrective value, (2) the previously-generated corrective value, and (3) the generated corrective value next to the currently-generated corrective value is subtracted from the value of the sample adjacently preceding the sample corresponding to the first latest detected extreme value when the first and second latest detected extreme values are a minimum value and a maximum value respectively.

A third aspect of this invention is based on the first aspect thereof, and provides a method wherein the generated corrective value and the designated samples are selectable from candidate ones designed to compensate for different degrees of degradation in audio quality of the digital audio signal.

A fourth aspect of this invention provides an apparatus for processing a digital audio signal having a sequence of samples. The apparatus comprises means for detecting every extreme value in an audio waveform represented by the digital audio signal, the extreme value being either a maximum value or a minimum value; means for detecting a number of samples between samples corresponding to the first and second latest detected extreme values to get a detected inter-extreme sample number; means for calculating a difference between the first and second latest detected extreme values to get a calculated inter-extreme difference; means for generating a corrective value in response to the detected inter-extreme sample number and the calculated inter-extreme difference, the generated corrective value being updated each time a new extreme value is detected; means for designating ones among samples in response to the detected inter-extreme sample number as objects to be corrected, the designated samples including at least (1) a sample adjacently following the sample corresponding to the second latest detected extreme value, (2) a sample adjacently preceding the sample corresponding to the first latest detected extreme value, and (3) one of the sample corresponding to the first latest detected extreme value and the sample corresponding to the second latest detected extreme value; and means for correcting the designated samples in response to at least one of (1) the currently-generated corrective value, (2) the previously-generated corrective value, and (3) a generated corrective value next to the currently-generated corrective value.

A fifth aspect of this invention is based on the fourth aspect thereof, and provides an apparatus wherein the correcting is such that one of (1) the currently-generated corrective value, (2) the previously-generated corrective value, and (3) the generated corrective value next to the currently-generated corrective value is subtracted from a value of the sample adjacently following the sample corresponding to the second latest detected extreme value and one of (1) the currently-generated corrective value, (2) the previously-generated corrective value, and (3) the generated corrective value next to the currently-generated corrective value is added to a value of the sample adjacently preceding the sample corresponding to the first latest detected extreme value when the first and second latest detected extreme values are a maximum value and a minimum value respectively, and that one of (1) the currently-generated corrective value, (2) the previously-generated corrective value, and (3) the generated corrective value next to the currently-generated corrective value is added to the value of the sample adjacently following the sample corresponding to the second latest detected extreme value and one of (1) the currently-generated corrective value, (2) the previously-generated corrective value, and (3) the generated corrective value next to the currently-generated corrective value is subtracted from the value of the sample adjacently preceding the sample corresponding to the first latest detected extreme value when the first and second latest detected extreme values are a minimum value and a maximum value respectively.

A sixth aspect of this invention is based on the fourth aspect thereof, and provides an apparatus wherein the generated corrective value and the designated samples are selectable from candidate ones designed to compensate for different degrees of degradation in audio quality of the digital audio signal.

A seventh aspect of this invention provides a computer program stored in a computer readable medium for processing a digital audio signal having a sequence of samples. The computer program comprises the steps of detecting every extreme value in an audio waveform represented by the digital audio signal, the extreme value being either a maximum value or a minimum value; detecting a number of samples between samples corresponding to the first and second latest detected extreme values to get a detected inter-extreme sample number; calculating a difference between the first and second latest detected extreme values to get a calculated inter-extreme difference; generating a corrective value in response to the detected inter-extreme sample number and the calculated inter-extreme difference, the generated corrective value being updated each time a new extreme value is detected; designating ones among samples in response to the detected inter-extreme sample number as objects to be corrected, the designated samples including at least (1) a sample adjacently following the sample corresponding to the second latest detected extreme value, (2) a sample adjacently preceding the sample corresponding to the first latest detected extreme value, and (3) one of the sample corresponding to the first latest detected extreme value and the sample corresponding to the second latest detected extreme value; and correcting the designated samples in response to at least one of (1) the currently-generated corrective value, (2) the previously-generated corrective value, and (3) a generated corrective value next to the currently-generated corrective value.

An eighth aspect of this invention is based on the seventh aspect thereof, and provides a computer program wherein the correcting is such that one of (1) the currently-generated corrective value, (2) the previously-generated corrective value, and (3) the generated corrective value next to the currently-generated corrective value is subtracted from a value of the sample adjacently following the sample corresponding to the second latest detected extreme value and one of (1) the currently-generated corrective value, (2) the previously-generated corrective value, and (3) the generated corrective value next to the currently-generated corrective value is added to a value of the sample adjacently preceding the sample corresponding to the first latest detected extreme value when the first and second latest detected extreme values are a maximum value and a minimum value respectively, and that one of (1) the currently-generated corrective value, (2) the previously-generated corrective value, and (3) the generated corrective value next to the currently-generated corrective value is added to the value of the sample adjacently following the sample corresponding to the second latest detected extreme value and one of (1) the currently-generated corrective value, (2) the previously-generated corrective value, and (3) the generated corrective value next to the currently-generated corrective value is subtracted from the value of the sample adjacently preceding the sample corresponding to the first latest detected extreme value when the first and second latest detected extreme values are a minimum value and a maximum value respectively.

A ninth aspect of this invention is based on the seventh aspect thereof, and provides a computer program wherein the generated corrective value and the designated samples are selectable from candidate ones designed to compensate for different degrees of degradation in audio quality of the digital audio signal.

A tenth aspect of this invention provides a method of pre-emphasizing a digital audio signal having a sequence of samples to generate a pre-emphasized digital audio signal before the pre-emphasized digital audio signal is compressed by an encoder. The pre-emphasizing is designed to compensate for audio quality degradation caused by the compression by the encoder. The method comprises the steps of detecting every extreme value in an audio waveform represented by the digital audio signal, the extreme value being either a maximum value or a minimum value; detecting a number of samples between samples corresponding to the first and second latest detected extreme values to get a detected inter-extreme sample number; calculating a difference between the first and second latest detected extreme values to get a calculated inter-extreme difference; generating a corrective value in response to the detected inter-extreme sample number and the calculated inter-extreme difference, the generated corrective value being updated each time a new extreme value is detected; designating ones among samples in response to the detected inter-extreme sample number and the degree of the audio quality degradation as objects to be corrected, the designated samples including at least (1) a sample adjacently following the sample corresponding to the second latest detected extreme value, (2) a sample adjacently preceding the sample corresponding to the first latest detected extreme value, and (3) one of the sample corresponding to the first latest detected extreme value and the sample corresponding to the second latest detected extreme value; and correcting the designated samples in response to at least one of (1) the currently-generated corrective value, (2) the previously-generated corrective value, and (3) a generated corrective value next to the currently-generated corrective value.

An eleventh aspect of this invention is based on the tenth aspect thereof, and provides a method wherein the correcting is such that one of (1) the currently-generated corrective value, (2) the previously-generated corrective value, and (3) the generated corrective value next to the currently-generated corrective value is subtracted from a value of the sample adjacently following the sample corresponding to the second latest detected extreme value and one of (1) the currently-generated corrective value, (2) the previously-generated corrective value, and (3) the generated corrective value next to the currently-generated corrective value is added to a value of the sample adjacently preceding the sample corresponding to the first latest detected extreme value when the first and second latest detected extreme values are a maximum value and a minimum value respectively, and that one of (1) the currently-generated corrective value, (2) the previously-generated corrective value, and (3) the generated corrective value next to the currently-generated corrective value is added to the value of the sample adjacently following the sample corresponding to the second latest detected extreme value and one of (1) the currently-generated corrective value, (2) the previously-generated corrective value, and (3) the generated corrective value next to the currently-generated corrective value is subtracted from the value of the sample adjacently preceding the sample corresponding to the first latest detected extreme value when the first and second latest detected extreme values are a minimum value and a maximum value respectively.

A twelfth aspect of this invention is based on the tenth aspect thereof, and provides a method wherein the generated corrective value and the designated samples are selectable from candidate ones designed to compensate for different degrees of degradation in audio quality of the digital audio signal.

A thirteenth aspect of this invention provides an apparatus for pre-emphasizing a digital audio signal having a sequence of samples to generate a pre-emphasized digital audio signal before the pre-emphasized digital audio signal is compressed by an encoder. The pre-emphasizing is designed to compensate for audio quality degradation caused by the compression by the encoder. The apparatus comprises means for detecting every extreme value in an audio waveform represented by the digital audio signal, the extreme value being either a maximum value or a minimum value; means for detecting a number of samples between samples corresponding to the first and second latest detected extreme values to get a detected inter-extreme sample number; means for calculating a difference between the first and second latest detected extreme values to get a calculated inter-extreme difference; means for generating a corrective value in response to the detected inter-extreme sample number and the calculated inter-extreme difference, the generated corrective value being updated each time a new extreme value is detected; means for designating ones among samples in response to the detected inter-extreme sample number and the degree of the audio quality degradation as objects to be corrected, the designated samples including at least (1) a sample adjacently following the sample corresponding to the second latest detected extreme value, (2) a sample adjacently preceding the sample corresponding to the first latest detected extreme value, and (3) one of the sample corresponding to the first latest detected extreme value and the sample corresponding to the second latest detected extreme value; and means for correcting the designated samples in response to at least one of (1) the currently-generated corrective value, (2) the previously-generated corrective value, and (3) a generated corrective value next to the currently-generated corrective value.

A fourteenth aspect of this invention is based on the thirteenth aspect thereof, and provides an apparatus wherein the correcting is such that one of (1) the currently-generated corrective value, (2) the previously-generated corrective value, and (3) the generated corrective value next to the currently-generated corrective value is subtracted from a value of the sample adjacently following the sample corresponding to the second latest detected extreme value and one of (1) the currently-generated corrective value, (2) the previously-generated corrective value, and (3) the generated corrective value next to the currently-generated corrective value is added to a value of the sample adjacently preceding the sample corresponding to the first latest detected extreme value when the first and second latest detected extreme values are a maximum value and a minimum value respectively, and that one of (1) the currently-generated corrective value, (2) the previously-generated corrective value, and (3) the generated corrective value next to the currently-generated corrective value is added to the value of the sample adjacently following the sample corresponding to the second latest detected extreme value and one of (1) the currently-generated corrective value, (2) the previously-generated corrective value, and (3) the generated corrective value next to the currently-generated corrective value is subtracted from the value of the sample adjacently preceding the sample corresponding to the first latest detected extreme value when the first and second latest detected extreme values are a minimum value and a maximum value respectively.

A fifteenth aspect of this invention is based on the thirteenth aspect thereof, and provides an apparatus wherein the generated corrective value and the designated samples are selectable from candidate ones designed to compensate for different degrees of degradation in audio quality of the digital audio signal.

A sixteenth aspect of this invention provides a computer program stored in a computer readable medium for pre-emphasizing a digital audio signal having a sequence of samples to generate a pre-emphasized digital audio signal before the pre-emphasized digital audio signal is compressed by an encoder. The pre-emphasizing is designed to compensate for audio quality degradation caused by the compression by the encoder. The computer program comprises the steps of detecting every extreme value in an audio waveform represented by the digital audio signal, the extreme value being either a maximum value or a minimum value; detecting a number of samples between samples corresponding to the first and second latest detected extreme values to get a detected inter-extreme sample number; calculating a difference between the first and second latest detected extreme values to get a calculated inter-extreme difference; generating a corrective value in response to the detected inter-extreme sample number and the calculated inter-extreme difference, the generated corrective value being updated each time a new extreme value is detected; designating ones among samples in response to the detected inter-extreme sample number and the degree of the audio quality degradation as objects to be corrected, the designated samples including at least (1) a sample adjacently following the sample corresponding to the second latest detected extreme value, (2) a sample adjacently preceding the sample corresponding to the first latest detected extreme value, and (3) one of the sample corresponding to the first latest detected extreme value and the sample corresponding to the second latest detected extreme value; and correcting the designated samples in response to at least one of (1) the currently-generated corrective value, (2) the previously-generated corrective value, and (3) a generated corrective value next to the currently-generated corrective value.

A seventeenth aspect of this invention is based on the sixteenth aspect thereof, and provides a computer program wherein the correcting is such that one of (1) the currently-generated corrective value, (2) the previously-generated corrective value, and (3) the generated corrective value next to the currently-generated corrective value is subtracted from a value of the sample adjacently following the sample corresponding to the second latest detected extreme value and one of (1) the currently-generated corrective value, (2) the previously-generated corrective value, and (3) the generated corrective value next to the currently-generated corrective value is added to a value of the sample adjacently preceding the sample corresponding to the first latest detected extreme value when the first and second latest detected extreme values are a maximum value and a minimum value respectively, and that one of (1) the currently-generated corrective value, (2) the previously-generated corrective value, and (3) the generated corrective value next to the currently-generated corrective value is added to the value of the sample adjacently following the sample corresponding to the second latest detected extreme value and one of (1) the currently-generated corrective value, (2) the previously-generated corrective value, and (3) the generated corrective value next to the currently-generated corrective value is subtracted from the value of the sample adjacently preceding the sample corresponding to the first latest detected extreme value when the first and second latest detected extreme values are a minimum value and a maximum value respectively.

An eighteenth aspect of this invention is based on the sixteenth aspect thereof, and provides a computer program wherein the generated corrective value and the designated samples are selectable from candidate ones designed to compensate for different degrees of degradation in audio quality of the digital audio signal.

A nineteenth aspect of this invention provides a method of processing a digital audio signal having a sequence of samples. The method comprises the steps of detecting every extreme value in an audio waveform represented by the digital audio signal, the extreme value being either a maximum value or a minimum value; repetitively detecting a local period of the audio waveform; repetitively detecting a local amplitude of the audio waveform; and correcting a sample corresponding to the detected extreme value, a sample adjacently preceding the sample corresponding to the detected extreme value, and a sample adjacently following the sample corresponding to the detected extreme value in response to the detected local period and the detected local amplitude.

A twentieth aspect of this invention provides an apparatus for processing a digital audio signal having a sequence of samples. The apparatus comprises means for detecting every extreme value in an audio waveform represented by the digital audio signal, the extreme value being either a maximum value or a minimum value; means for repetitively detecting a local period of the audio waveform; means for repetitively detecting a local amplitude of the audio waveform; and means for correcting a sample corresponding to the detected extreme value, a sample adjacently preceding the sample corresponding to the detected extreme value, and a sample adjacently following the sample corresponding to the detected extreme value in response to the detected local period and the detected local amplitude.

This invention has advantages as indicated hereafter. Not only a signal sample corresponding to an extreme value but also signal samples adjacently preceding and adjacently following the extreme-value-corresponding sample are corrected. Therefore, it is possible to sufficiently compensate for audio quality degradation caused by compression or repetitively dubbing of an original audio signal. In addition, it is possible to enhance the audio quality of a degraded audio signal to a level close to an original audio quality.

DETAILED DESCRIPTION OF THE INVENTION

First Embodiment

Figure 1:
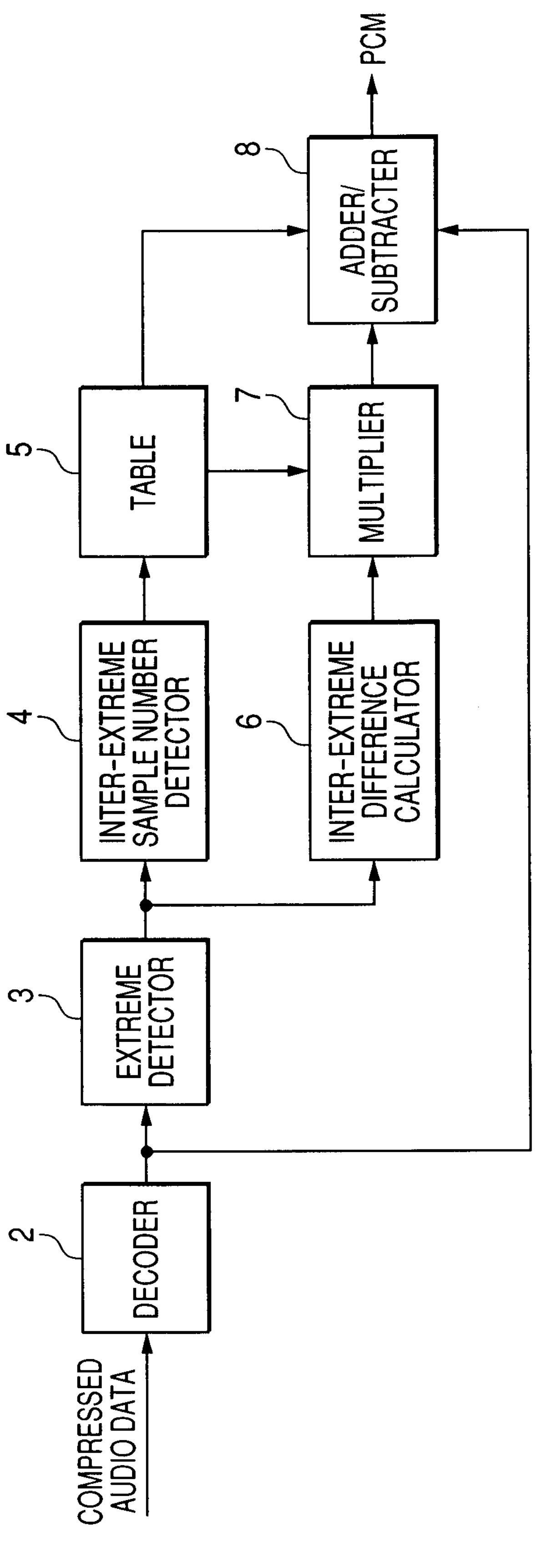
FIG. 1 is a block diagram of a digital-audio-signal processing apparatus according to a first embodiment of this invention.

FIG. 1 shows a digital-audio-signal processing apparatus according to a first embodiment of this invention. The apparatus of FIG. 1 can be provided in, for example, a digital television receiver or a portable terminal.

The apparatus of FIG. 1 includes a decoder 2, an extreme detector 3, an inter-extreme sample number detector 4, a table 5, an inter-extreme difference calculator 6, a multiplier 7, and an adder/subtractor 8.

The decoder 2 receives compressed audio data (a first digital audio signal) which results from compressing an original audio signal according to a predetermined compression scheme such as AAC (Advanced Audio Coding) or MP3. Thus, the compressed audio data is, for example, an AAC signal or an MP3 signal. The decoder 2 expands the compressed audio data into a first PCM signal (a before-correction PCM signal or a second digital audio signal) according to a predetermined expansion scheme inverse with respect to the predetermined compression scheme. The first PCM signal has a sequence of samples related to a predetermined sampling frequency. Every sample in the first PCM signal has a predetermined number of bits. The decoder 2 applies the first PCM signal to the extreme detector 3 and the adder/subtractor 8.

The extreme detector 3 detects every local maximum value and every local minimum value (that is, every local peak and every local valley) in the audio waveform represented by the applied first PCM signal. The maximum and minimum values are also referred to as the extremes or extreme values. The extreme detector 3 identifies samples in the first PCM signal which represent the detected maximum values and the detected minimum values. The identified samples are referred to as the extreme-representing samples, or the maximum-representing samples and the minimum-representing samples. The extreme detector 3 notifies the extreme-representing samples to the inter-extreme sample number detector 4. In addition, the extreme detector 3 passes the first PCM signal to the inter-extreme sample number detector 4. The extreme detector 3 notifies the extreme values and the extreme-representing samples to the inter-extreme difference calculator 6.

The inter-extreme sample number detector 4 repetitively counts samples in the first PCM signal between two temporally-adjacent extreme-representing samples notified by the extreme detector 3. Accordingly, the device 4 repetitively detects the number of samples in the first PCM signal between two temporally-adjacent extreme-representing samples. The detected sample number is called the detected inter-extreme sample number SN. The detected sample number is equal to the number of samples between a maximum-representing sample and a minimum-representing sample subsequent thereto or the number of samples between a minimum-representing sample and a maximum-representing sample subsequent thereto. The inter-extreme sample number detector 4 notifies every detected inter-extreme sample number SN to the table 5.

Since the detected inter-extreme sample number SN has a fixed relation with a local period or a local frequency (an instantaneous period and an instantaneous frequency) of the audio waveform represented by the first PCM signal, the detection of the inter-extreme sample number SN means detection of the local period or the local frequency of the audio waveform.

Specifically, the inter-extreme sample number SN is equal to one of (1) the number of samples starting from a first extreme-representing sample and ending at a sample immediately preceding a second extreme-representing sample after the first extreme-representing sample, (2) the number of samples starting from the first extreme-representing sample and ending at the second extreme-representing sample, (3) the number of samples starting from a sample immediately following the first extreme-representing sample and ending at the second extreme-representing sample, and (4) the number of samples starting from the sample immediately following the first extreme-representing sample and ending the sample immediately preceding the second extreme-representing sample.

The inter-extreme difference calculator 6 repetitively computes the difference between two extremes represented by temporally-adjacent extreme-representing samples notified by the extreme detector 3. The computed difference is called the computed inter-extreme difference. The computed difference is equal to the difference between a maximum value and a minimum value subsequent thereto or the difference between a minimum value and a maximum value subsequent thereto. The inter-extreme difference calculator 6 notifies every computed inter-extreme difference to the multiplier 7. In addition, the inter-extreme difference calculator 6 informs the multiplier 7 whether the last extreme is a maximum value or a minimum value. It should be noted that the inter-extreme difference means a local amplitude (an instantaneous amplitude) of the audio waveform represented by the first PCM signal.

Figures 2, 3:
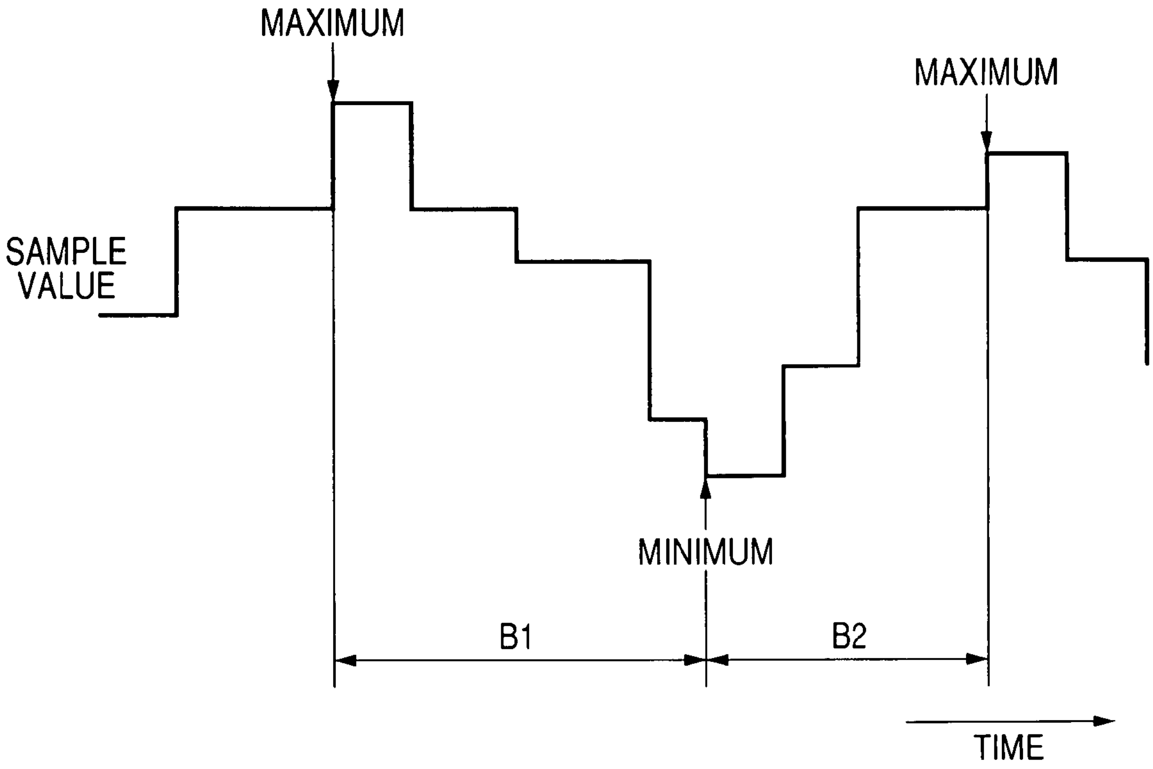
FIG. 2 is a diagram showing an example of the contents of a table in FIG. 1.
FIG. 3 is a time-domain diagram showing a first example of a sequence of sample values.

The table 5 is provided in a memory. With reference to FIG. 2, the table 5 stores data representing predetermined inter-extreme sample numbers, predetermined coefficients, and predetermined correction sample numbers which are in a prescribed assignment relation. Specifically, the data in the table 5 indicates a set of rows each having a predetermined inter-extreme sample number, a predetermined coefficient assigned to the predetermined inter-extreme sample number, and a predetermined correction sample number assigned to the predetermined inter-extreme sample number. Each correction sample number indicates the number of samples to be corrected for an interval between two temporally neighboring extreme-representing samples. In general, as an inter-extreme sample number increases, a coefficient and a correction sample number assigned thereto increase. For example, a coefficient of 1/32 and a correction sample number of 1 are assigned to an inter-extreme sample number of 4. A coefficient of 1/16 and a correction sample number of 1 are assigned to an inter-extreme sample number of 5. A coefficient of 1/14 and a correction sample number of 5 are assigned to an inter-extreme sample number of 6. A coefficient of 1/8 and a correction sample number of 9 are assigned to an inter-extreme sample number of 7.

One among the rows in the table 5 is accessed in response to the inter-extreme sample number notified by the inter-extreme sample number detector 4. Specifically, the accessed row has a predetermined inter-extreme sample number equal to the notified inter-extreme sample number. The table 5 informs the multiplier 7 of a predetermined coefficient in the accessed row. The coefficient sent from the table 5 to the multiplier 7 is denoted by the character "α". The table 5 notifies the adder/subtractor 8 of a predetermined correction sample number in the accessed row.

The multiplier 7 receives the inter-extreme difference from the inter-extreme difference calculator 6. The device 7 multiplies the inter-extreme difference by the coefficient "α" to get a corrective value. The multiplier 7 notifies the corrective value to the adder/subtractor 8. In addition, the multiplier 7 passes, to the adder/subtractor 8, the information about whether the last extreme is a maximum value or a minimum value.

The adder/subtractor 8 selects samples from the first PCM signal in response to the correction sample number notified by the table 5. The selected samples are objects to be corrected. The number of the selected samples is equal to the notified correction sample number. Preferably, the selected samples are (1) the first latest extreme-representing sample, (2) ones immediately preceding the first latest extreme-representing sample, and (3) ones immediately following the second latest extreme-representing sample.

In the case where the first latest extreme and the second latest extreme are a maximum value and a minimum value respectively, the adder/subtractor 8 subtracts the preceding corrective value notified by the multiplier 7 from the values of the selected samples immediately following the second latest extreme-representing sample to get correction-resultant values and correction-resultant samples representing the respective correction-resultant values. In this case, the adder/subtractor 8 adds the current corrective value notified by the multiplier 7 to the values of the first latest extreme-representing sample and the selected samples immediately preceding the latest extreme-representing sample to get correction-resultant values and correction-resultant samples representing the respective correction-resultant values.

In the case where the first latest extreme and the second latest extreme are a minimum value and a maximum value respectively, the adder/subtractor 8 adds the preceding corrective value notified by the multiplier 7 to the values of the selected samples immediately following the second latest extreme-representing sample to get correction-resultant values and correction-resultant samples representing the respective correction-resultant values. In this case, the adder/subtractor 8 subtracts the current corrective value notified by the multiplier 7 from the values of the first latest extreme-representing sample and the selected samples immediately preceding the first latest extreme-representing sample to get correction-resultant values and correction-resultant samples representing the respective correction-resultant values.

It should be noted that all the selected samples may be corrected in response to the current corrective value.

The adder/subtractor 8 replaces the selected samples in the first PCM signal with the correction-resultant samples to correct the first PCM signal into a second PCM signal (an after-correction PCM signal or a third digital audio signal). In general, the adder/subtractor 8 includes delay devices and memories for providing desired timing relations among the first PCM signal, the correction sample number notified by the table 5, and the corrective value notified by the multiplier 7. The adder/subtractor 8 outputs the second PCM signal to a later stage (not shown).

FIG. 3 shows an example of the waveform values of successive samples in the first PCM signal. With reference to FIG. 3, maximum values and minimum values among the waveform values are detected by the extreme detector 3. The number of samples in an interval B1 between a maximum-representing sample and a minimum-representing sample subsequent thereto, and the number of samples in an interval B2 between the minimum-representing sample and a maximum-representing sample subsequent thereto are detected by the inter-extreme sample number detector 4. Every inter-extreme sample number detected by the device 4 corresponds to a phase angle of 180 degrees with respect to the first PCM signal. The inter-extreme sample number increases and decreases as the local frequency (the instantaneous frequency) of the audio waveform represented by the first PCM signal decreases and increases, respectively. In the case where the first PCM signal relates to a sampling frequency of 44.1 kHz, the inter-extreme sample number is equal to 1000 and 1 when the local audio frequency of the first PCM signal is 20 Hz and 20 kHz respectively.

With reference back to FIG. 2, the inter-extreme sample number decreases as the local audio frequency of the first PCM signal increases. The correction sample number increases as the local audio frequency of the first PCM signal decreases. When the inter-extreme sample number is equal to 4, the correction sample number and the coefficient are equal to 1 and 1/32 respectively. Thus, in this case, only the current extreme-representing sample in the first PCM signal is corrected in response to the coefficient "1/32".

When the inter-extreme sample number is equal to 5, the correction sample number and the coefficient are equal to 1 and 1/16 respectively. Thus, in this case, only the current extreme-representing sample in the first PCM signal is corrected in response to the coefficient "1/16" being greater than the coefficient "1/32".

When the inter-extreme sample number is equal to 6, the correction sample number and the coefficient are equal to 5 and 1/14 respectively. Thus, in this case, the first latest extreme-representing sample in the first PCM signal, two samples immediately preceding the first latest extreme-representing sample, and two samples immediately following the second latest extreme-representing sample are corrected. The correction of the two samples immediately following the second latest extreme-representing sample is responsive to the preceding coefficient. The correction of the first latest extreme-representing sample and the two samples immediately preceding the first latest extreme-representing sample is responsive to the coefficient "1/14" being greater than the coefficient "1/16". In addition, the correction of next selected samples immediately following the first latest extreme-representing sample will be responsive to the coefficient "1/14".

When the inter-extreme sample number is equal to 7, the correction sample number and the coefficient are equal to 9 and 1/8 respectively. Thus, in this case, the first latest extreme-representing sample in the first PCM signal, four samples immediately preceding the first latest extreme-representing sample, and four samples immediately following the second latest extreme-representing sample are corrected. The correction of the four samples immediately following the second latest extreme-representing sample is responsive to the preceding coefficient. The correction of the first latest extreme-representing sample and the four samples immediately preceding the first latest extreme-representing sample is responsive to the coefficient "1/8" being greater than the coefficient "1/14". In addition, the correction of next selected samples immediately following the first latest extreme-representing sample will be responsive to the coefficient "1/8".

At least one of the correction sample numbers listed in the table 5 may be equal to 3. When the correction sample number equal to 3 is continuously used, the current extreme-representing sample in the first PCM signal, one sample immediately preceding the current extreme-representing sample, and one sample immediately following the current extreme-representing sample are corrected.

Figure 4:
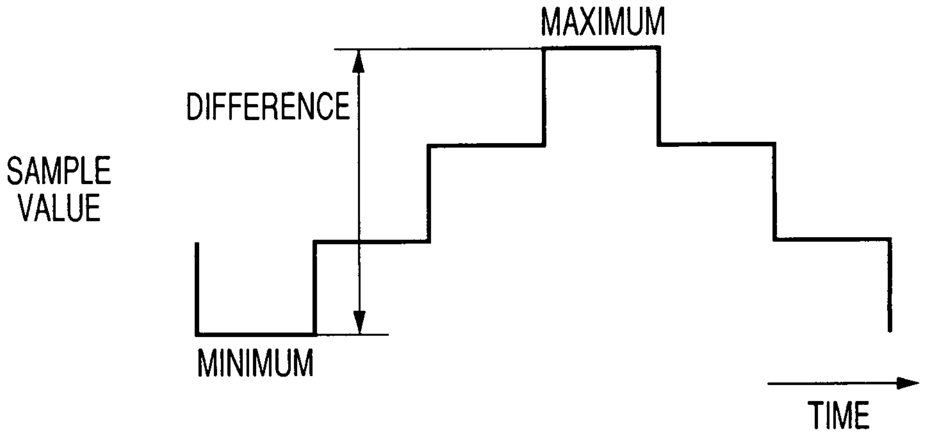
FIG. 4 is a time-domain diagram showing a second example of a sequence of sample values.

With reference to FIG. 4, the inter-extreme difference calculator 6 computes the difference (the inter-extreme difference) between a minimum value and a maximum value occurring after the minimum value. The minimum value and the maximum value are detected by the extreme detector 3 before being sent therefrom to the inter-extreme difference calculator 6. The multiplier 7 receives the inter-extreme difference from the inter-extreme difference calculator 6. The multiplier 7 receives the coefficient "α" from the table 5. The device 7 multiplies the inter-extreme difference by the coefficient "α" to get a corrective value. The inter-extreme difference and the corrective value for a maximum-representing sample and samples immediately following and preceding the maximum-representing sample are denoted by "A" and "A•α" respectively. The inter-extreme difference and the corrective value for a minimum-representing sample and samples immediately following and preceding the minimum-representing sample are denoted by "B" and "B•α" respectively. The multiplier 7 notifies the corrective value to the adder/subtractor 8. When the correction sample number sent from the table 5 to the adder/subtractor 8 is continuously equal to 3, the adder/subtractor 8 selects every current extreme-representing sample, one sample immediately-preceding the current extreme-representing sample, and one sample immediately-following the current extreme-representing sample.

Figure 5:
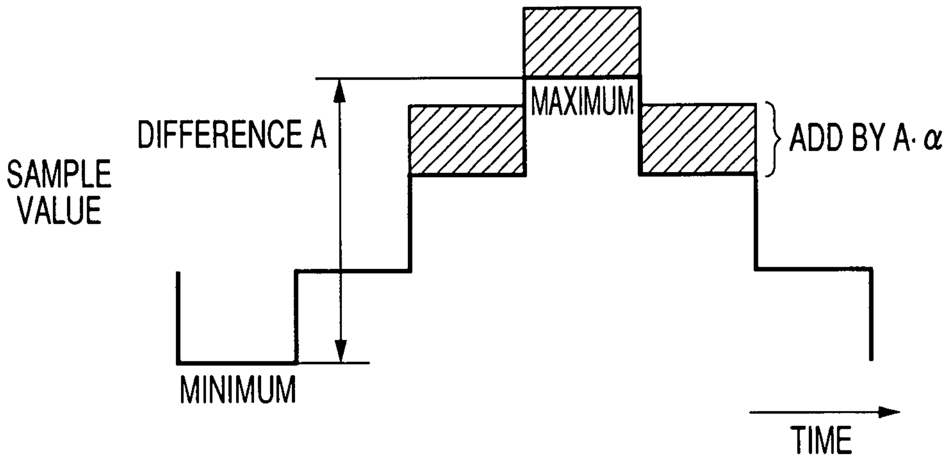
FIG. 5 is a time-domain diagram showing a third example of a sequence of sample values including corrected sample values at and around a maximum value.
Figure 6:
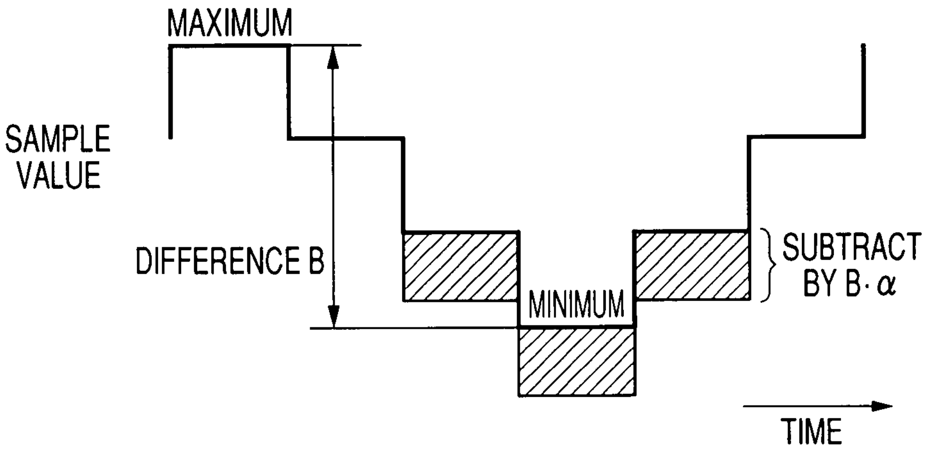
FIG. 6 is a time-domain diagram showing a fourth example of a sequence of sample values including corrected sample values at and around a minimum value.

With reference to FIG. 5, in the case where the correction sample number sent from the table 5 to the adder/subtractor 8 is continuously equal to 3, the adder/subtractor 8 adds the corrective value "A•α" notified by the multiplier 7 to the values of every maximum-representing sample, one sample immediately-preceding the maximum-representing sample, and one sample immediately-following the maximum-representing sample to get correction-resultant values and correction-resultant samples representing the respective correction-resultant values. With reference to FIG. 6, in the case where the correction sample number sent from the table 5 to the adder/subtractor 8 is continuously equal to 3, the adder/subtractor 8 subtracts the corrective value "B•α" notified by the multiplier 7 from the values of every minimum-representing sample, one sample immediately-preceding the minimum-representing sample, and one sample immediately-following the minimum-representing sample to get correction-resultant values and correction-resultant samples representing the respective correction-resultant values.

Figure 7:
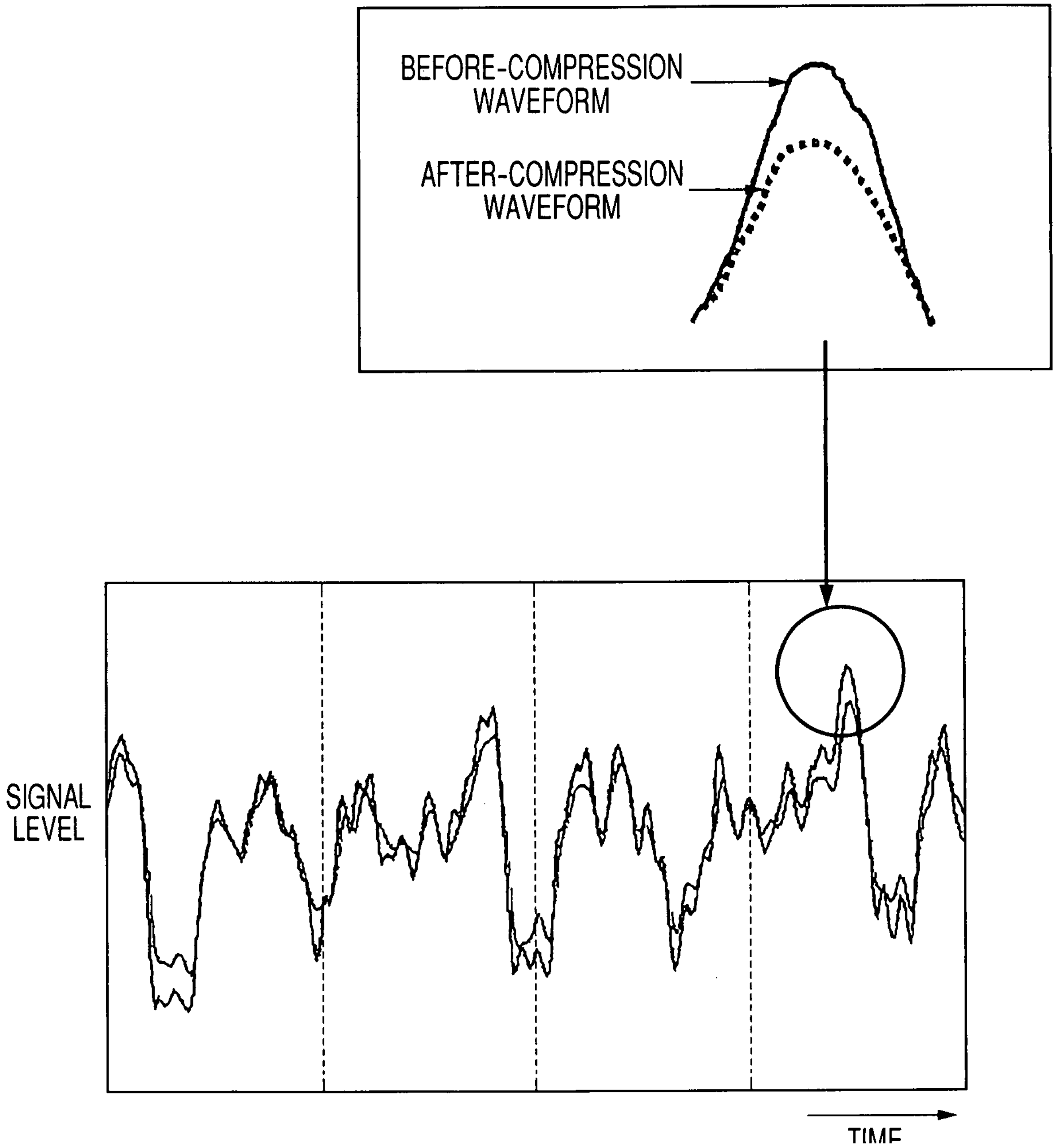
FIG. 7 is a time-domain diagram showing an example of a before-correction waveform and an after-correction waveform.

FIG. 7 shows an example of the audio waveforms represented by a before-compression audio signal and an after-compression audio signal which results from compression of the before-compression audio signal. The after-compression audio signal lacks high-frequency components due to the compression. Specifically, the audio qualities of maximum-representing samples, minimum-representing samples, samples temporally neighboring the maximum-representing samples, and samples temporally neighboring the minimum-representing samples in the after-compression audio signal are degraded relative to those in the before-compression audio signal. The apparatus of FIG. 1 can sufficiently compensate for the degradation of the audio qualities of these samples in the after-compression audio signal.

Figure 16:
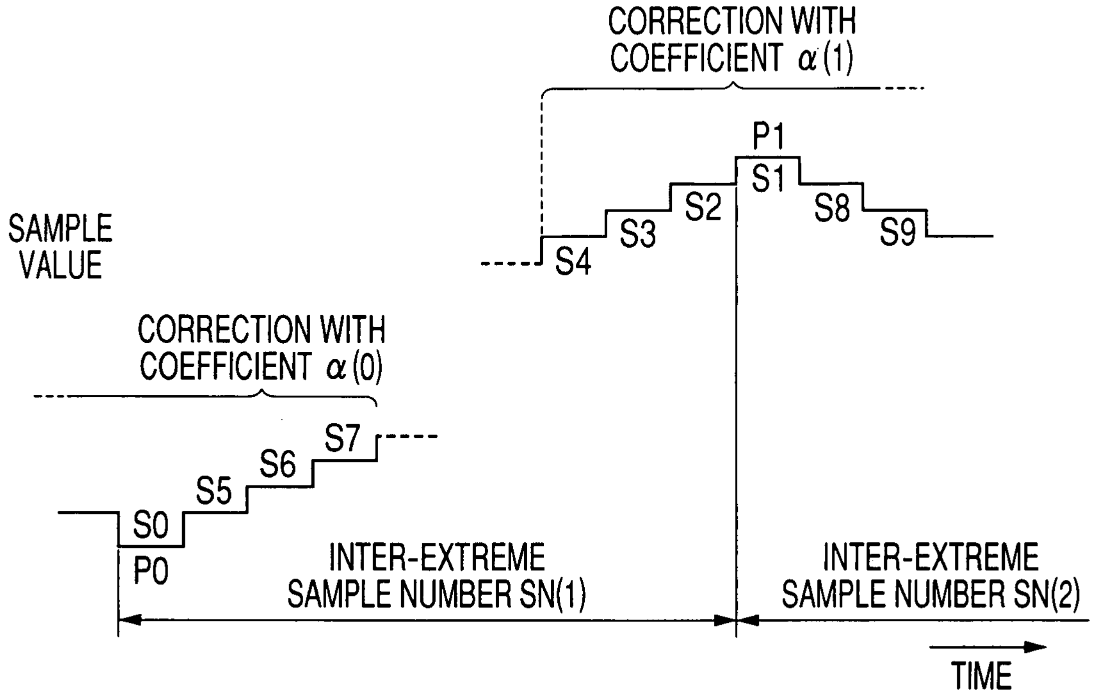
FIGS. 16 and 17 are time-domain diagrams showing an example of a waveform formed by a sequence of sample values.

At least one of the correction sample numbers listed in the table 5 may be equal to 7. With reference to FIG. 16, there are a first extreme P0 and a second extreme P1 after the first extreme P0. The first and second extremes P0 and P1 correspond to samples S0 and S1, respectively. In the apparatus of FIG. 1, the number SN(1) of samples between the first and second extreme-representing samples S0 and S1 is detected. The detected inter-extreme sample number SN(1) is notified to the table 5 so that a coefficient "α(1)" and a correction sample number CN(1) assigned to the detected inter-extreme sample number SN(1) are read out from the table 5. When the read-out correction sample number CN(1) is equal to 7, three samples S5, S6, and S7 immediately following the first extreme-representing sample S0, three samples S2, S3, and S4 immediately preceding the second extreme-representing sample S1, and the second extreme-representing sample S1 are selected and designated as objects to be corrected. The samples S5, S6, and S7 are corrected in response to the corrective value depending on the preceding coefficient "α(0)" determined by the number SN(0) of samples between the first extreme-presenting sample S0 and the preceding extreme-representing sample. The second extreme-representing sample S1, and the samples S2, S3, and S4 immediately preceding the second extreme-representing sample S1 are corrected in response to the corrective value depending on the current coefficient "α(1)". Furthermore, correction-object samples (S8, S9, . . . ) immediately following the second extreme-representing sample S1 and determined by the number SN(2) of samples between the second extreme-representing sample S1 and a third extreme-representing sample (not shown) will be corrected in response to the corrective value depending on the coefficient "α(1)".

Second Embodiment

Figure 8:
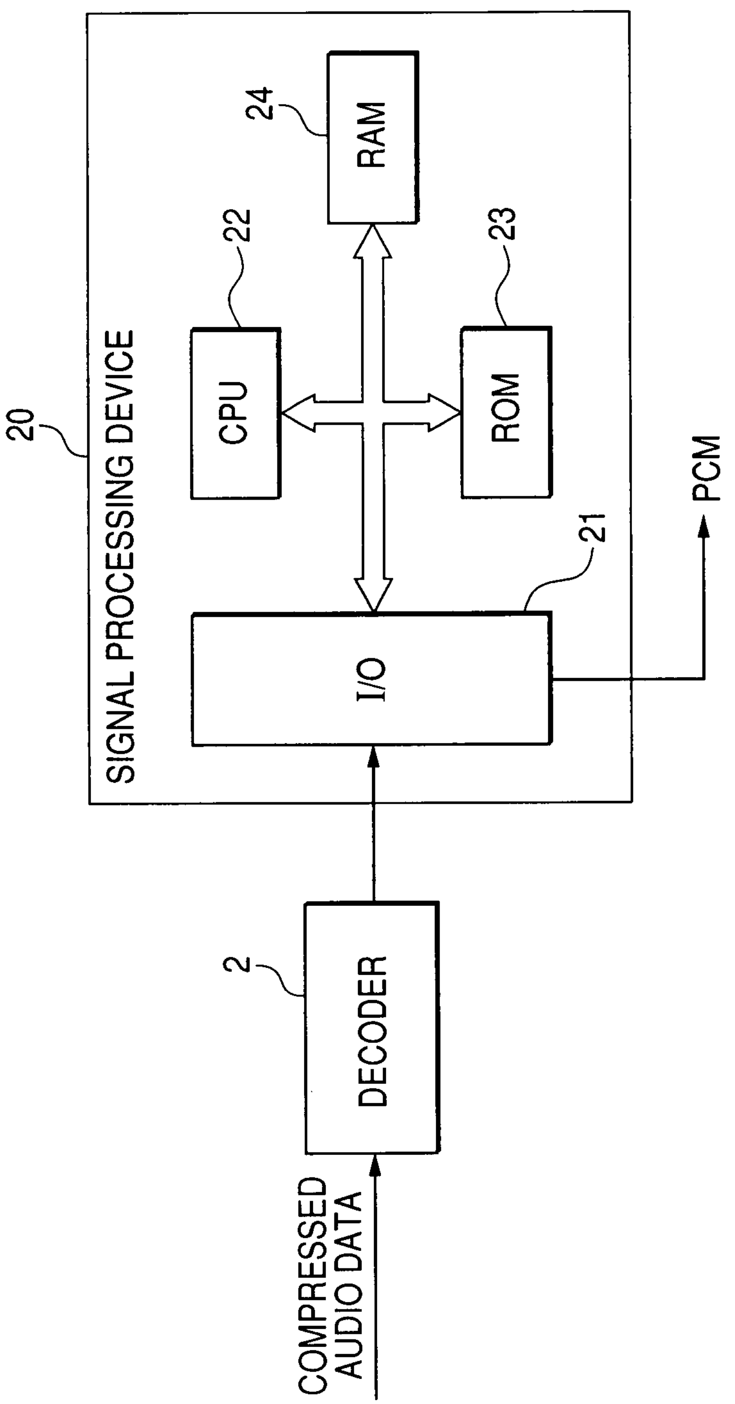
FIG. 8 is a block diagram of a digital-audio-signal processing apparatus according to a second embodiment of this invention.

FIG. 8 shows a digital-audio-signal processing apparatus according to a second embodiment of this invention. The apparatus of FIG. 8 is similar to the apparatus of FIG. 1 except for design changes mentioned hereafter.

The apparatus of FIG. 8 includes a signal processing device 20 which replaces the combination of the devices 3-8 in FIG. 1. The signal processing device 20 includes a computer, a digital signal processor, or a similar device which has a combination of an input/output (I/O) port 21, a CPU 22, a ROM 23, and a RAM 24. The I/O port 21 is connected with the decoder 2. The I/O port 21 receives the first PCM signal from the decoder 2. The signal processing device 20 operates in accordance with a control program (a computer program) stored in the ROM 23 or the RAM 24. A table equal or similar to the table 5 in FIG. 1 is provided in the ROM 23 or the RAM 24.

The signal processing device 20 corrects the first PCM signal into the second PCM signal. The I/O port 21 outputs the second PCM signal to a later stage (not shown).

Figure 9:
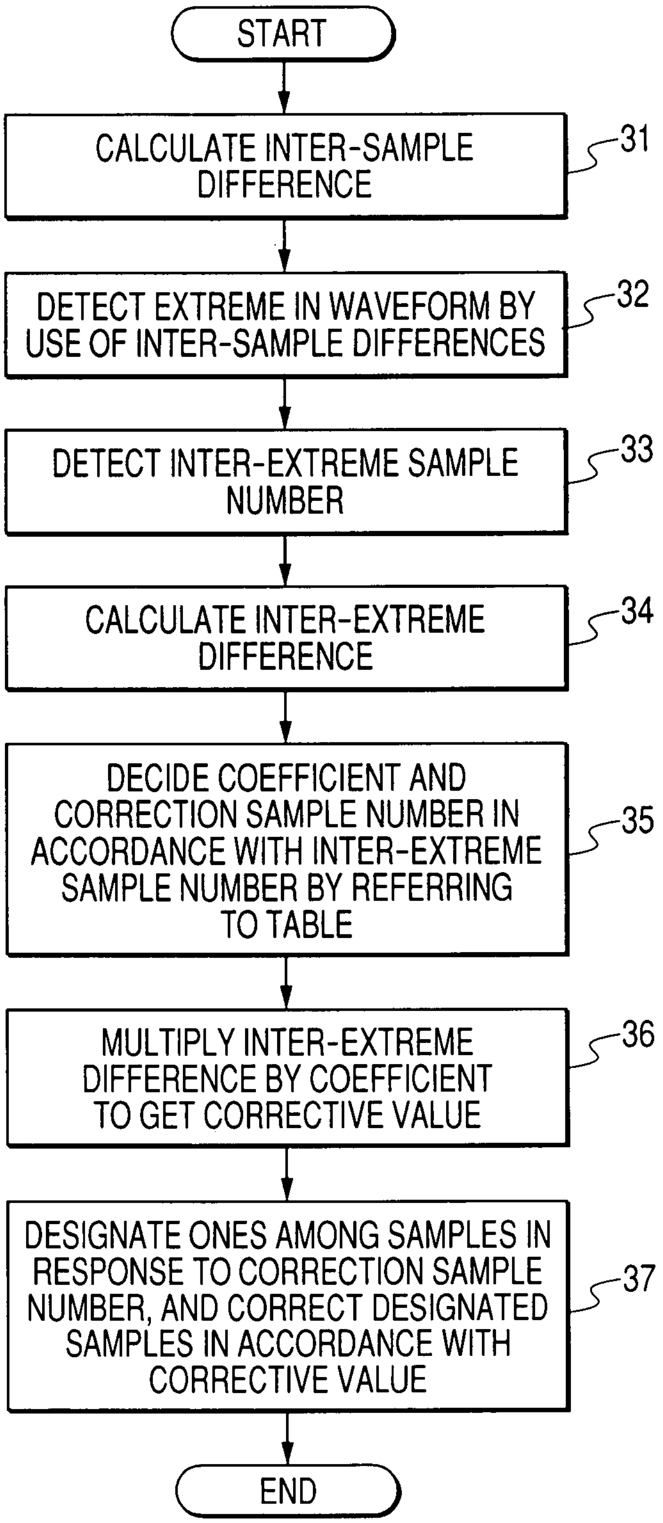
FIG. 9 is a flowchart of a segment of a control program for a signal processing device in FIG. 8.

FIG. 9 is a flowchart of a segment of the control program for the signal processing device 20. The program segment in FIG. 9 is executed each time a sample in the first PCM signal arrives at the signal processing device 20 (the I/O port 21). In other words, the program segment is iterated. The program segment is designed to process a sequence of samples in the first PCM signal as mentioned hereafter.

With reference to FIG. 9, a first step 31 of the program segment subtracts the value SV(0) represented by the current sample S(0) from the value SV(−1) represented by the sample S(−1) immediately preceding the current sample S(0) to get a current inter-sample difference SD(0). The step 31 stores information about the current inter-sample difference SD(0) into the RAM 24 for later use.

A step 32 following the step 31 accesses the RAM 24, and retrieves information about the inter-sample difference SD(−1) immediately preceding the current one SD(0). The step 32 decides whether or not the sign of the current inter-sample difference SD(0) is opposite to that of the immediately-preceding inter-sample difference SD(−1). When the sign of the current inter-sample difference SD(0) is opposite to that of the immediately-preceding inter-sample difference SD(−1), the step 32 recognizes the immediately-preceding sample S(−1) as the latest extreme-representing sample. The step 32 stores information about the latest extreme-representing sample into the RAM 24 for later use.

Specifically, the step 32 decides whether the opposite-sign condition corresponds to a negative-to-positive change or a positive-to-negative change. When the opposite-sign condition corresponds to a negative-to-positive change, the step 32 recognizes the immediately-preceding sample S(−1) as the latest maximum-representing sample. When the opposite-sign condition corresponds to a positive-to-negative change, the step 32 recognizes the immediately-preceding sample S(−1) as the latest minimum-representing sample.

A step 33 subsequent to the step 32 is executed provided that the latest extreme-representing sample has just been detected by the step 32. Otherwise, the step 33 is skipped. The step 33 accesses the RAM 24, and retrieves information about the second latest extreme-representing sample (the extreme-representing sample immediately preceding the latest extreme-representing sample). The step 33 counts samples between the first latest extreme-representing sample and the second latest extreme-representing sample. The count result is defined as the inter-extreme sample number.

A step 34 following the step 33 is executed provided that the latest extreme-representing sample has just been detected by the step 32. Otherwise, the step 34 is skipped. The step 34 accesses the RAM 24, and retrieves the information about the second latest extreme-representing sample. The step 34 computes the difference between the extreme represented by the first latest extreme-representing sample and the extreme represented by the second latest extreme-representing sample. The computed difference is defined as the computed inter-extreme difference.

A step 35 subsequent to the step 34 is executed provided that the latest extreme-representing sample has just been detected by the step 32. Otherwise, the step 35 is skipped. The step 35 accesses the table in response to the inter-extreme sample number given by the step 33, and thereby reads out, from the table, a coefficient "α" and a correction sample number assigned to the inter-extreme sample number.

A step 36 following the step 35 multiplies the inter-extreme difference by the coefficient "α" to get a corrective value. The inter-extreme difference is given by the step 34. The step 36 stores information about the corrective value into the RAM 24 for later use.

A step 37 subsequent to the step 36 accesses the RAM 24 to retrieve information about the first latest extreme-representing sample and the second latest extreme-representing sample, and information about the preceding corrective value. The step 37 designates ones among samples in response to the correction sample number given by the step 35, the first latest extreme-representing sample, and the second latest extreme-representing sample. The designated samples are objects to be corrected. The number of the designated samples is equal to the correction sample number. The designated samples are the first latest extreme-representing sample, samples immediately preceding the first latest extreme-representing sample, and samples immediately following the second latest extreme-representing sample. The step 37 decides whether or not the first latest extreme-representing sample and the second latest extreme-representing sample correspond to a maximum value and a minimum value respectively. In the case where the first latest extreme-representing sample and the second latest extreme-representing sample correspond to a maximum value and a minimum value respectively, the step 37 subtracts the preceding corrective value from the value of each of the designated samples immediately following the second latest extreme-representing sample to correct the target sample. In this case, the step 37 adds the current corrective value to the value of each of the first latest extreme-representing sample and the designated samples immediately preceding the first latest extreme-representing samples to correct the target sample. On the other hand, in the case where the first latest extreme-representing sample and the second latest extreme-representing sample correspond to a minimum value and a maximum value respectively, the step 37 adds the preceding corrective value to the value of each of the designated samples immediately following the second latest extreme-representing sample to correct the target sample. In this case, the step 37 subtracts the current corrective value from the value of each of the first latest extreme-representing sample and the designated samples immediately preceding the first latest extreme-representing samples to correct the target sample. The step 37 maintains each of samples other than the designated samples as it is. The step 37 outputs either the corrected sample or the uncorrected sample to an external device (not shown) as a sample of the second PCM signal. After the step 37, the current execution cycle of the program segment ends.

It should be noted that all the designated samples may be corrected in response to the current corrective value.

As previously mentioned, the program segment in FIG. 9 is iterated. Accordingly, the step 37 is repetitively executed. The repetitive execution of the step 37 allows all the designated samples to be corrected in response to the preceding and current corrective values.

Figure 10:
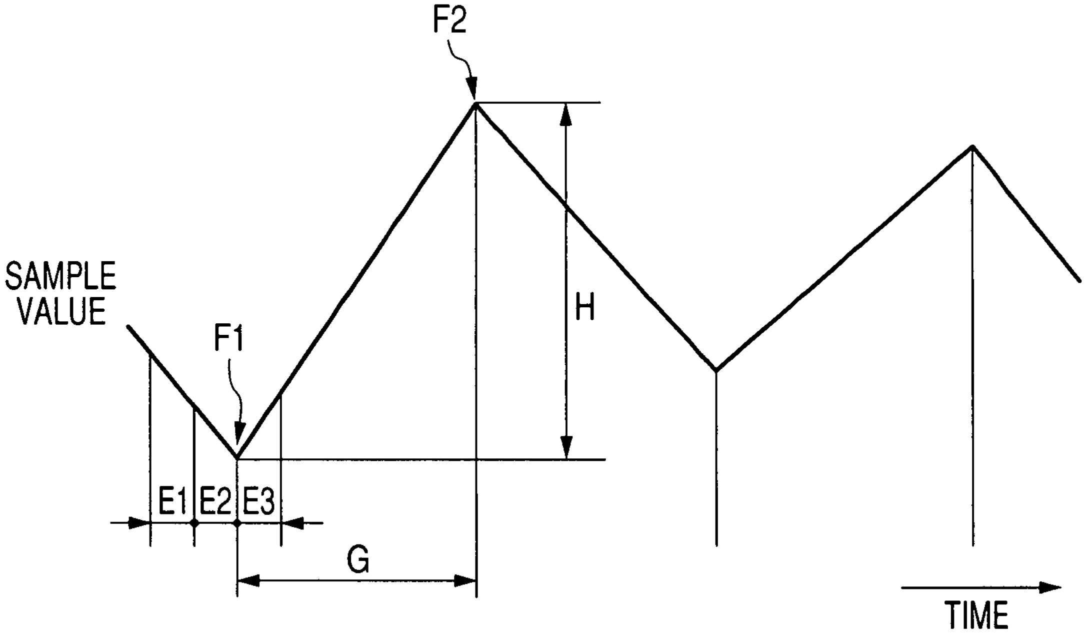
FIGS. 10 and 11 are time-domain diagrams showing an example of a waveform formed by a sequence of sample values.

With reference to FIG. 10, the value SV(0) represented by the current sample S(0) is subtracted from the value SV(−1) represented by the sample S(−1) immediately preceding the current sample S(0) to get a current inter-sample difference SD(0) for each of sample periods E1, E2, E3, . . . The subtraction is performed by the step 31 in FIG. 9.

A decision is made as to whether or not the sign of the current inter-sample difference SD(0) is opposite to that of the immediately-preceding inter-sample difference SD(−1) for each of sample periods E1, E2, E3, . . . The decision is performed by the step S32 in FIG. 9. When the sign of the current inter-sample difference SD(0) is opposite to that of the immediately-preceding inter-sample difference SD(−1), the immediately-preceding sample S(−1) is recognized as the latest extreme-representing sample (see extreme F1 and F2 in FIG. 10). The recognition is performed by the step 32 in FIG. 9. Specifically, a decision is made as to whether the opposite-sign condition corresponds to a negative-to-positive change or a positive-to-negative change. When the opposite-sign condition corresponds to a negative-to-positive change, the immediately-preceding sample S(−1) is recognized as the latest maximum-representing sample (see the extreme F2 in FIG. 10). When the opposite-sign condition corresponds to a positive-to-negative change, the immediately-preceding sample S(−1) is recognized as the latest minimum-representing sample (see the extreme F1 in FIG. 10).

During the interval G between the first extreme-representing sample and the second extreme-representing sample (corresponding to, for example, the extremes F1 and F2 in FIG. 10) after the first extreme-representing sample, samples are counted. Thereby, the inter-extreme sample number is detected. The detection is performed by the step S33 in FIG. 9.

A computation is made as to the difference H between the extreme F1 represented by the first extreme-representing sample and the extreme F2 represented by the second extreme-representing sample. The computation is performed by the step 34 in FIG. 9. The inter-extreme sample number is notified to the table so that a coefficient "α" and a correction sample number assigned to the inter-extreme sample number are read out from the table. This action is performed by the step 35 in FIG. 9. The inter-extreme difference H is multiplied by the coefficient "α" to get a corrective value. The multiplication is performed by the step 36 in FIG. 9.

Figure 11:
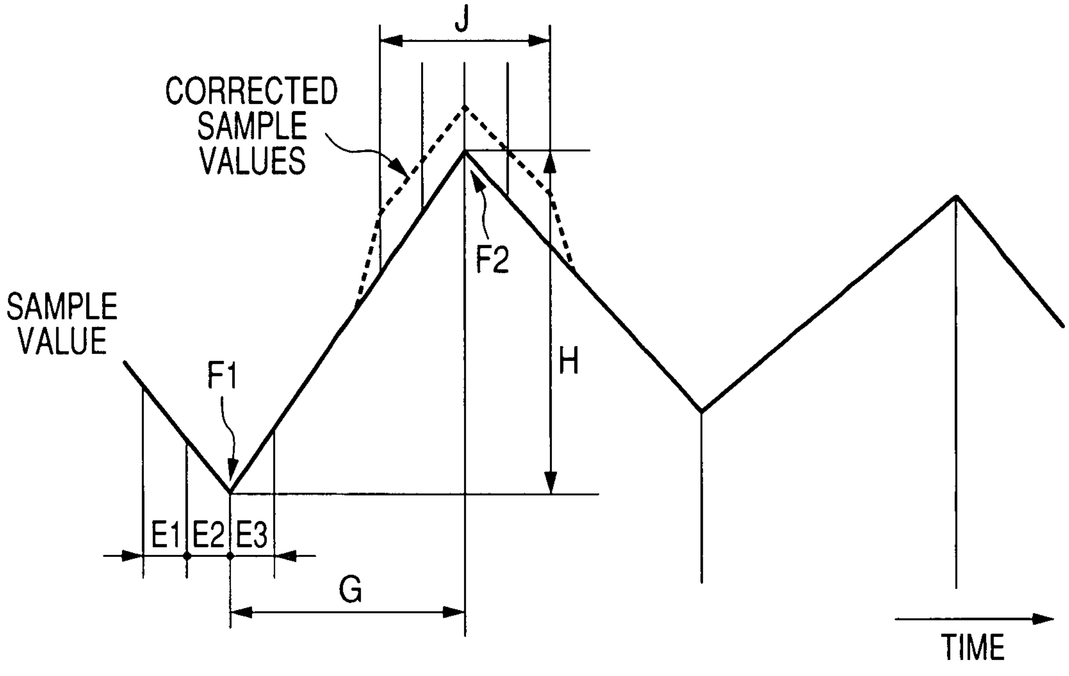

Ones are designated among samples in response to the correction sample number, the first extreme-representing sample, and the second extreme-representing sample. The number of the designated samples is equal to the correction sample number. The designated samples are the second extreme-representing sample, samples immediately preceding the second extreme-representing sample, and samples immediately following the first extreme-representing sample. In FIG. 11, the designated samples immediately preceding the second extreme-representing sample occupy the former portion of an interval J at and around the second extreme-representing sample. In FIG. 11, since the second extreme-representing sample corresponds to a maximum value, the corrective value is added to the value of each of the second extreme-representing sample and the designated samples immediately preceding the second extreme-representing sample. Accordingly, the second extreme-representing sample and the designated samples immediately preceding the second extreme-representing sample are corrected. There are next designated samples in the later portion of the interval J which immediately follow the second extreme-representing sample. A next corrective value will be added to the value of each of the next designated samples. Thus, the next designated samples will be corrected.

Third Embodiment

A third embodiment of this invention is similar to the first or second embodiment thereof except that the decoder 2 (see FIGS. 1 and 8) is omitted.

Fourth Embodiment

Figure 12:
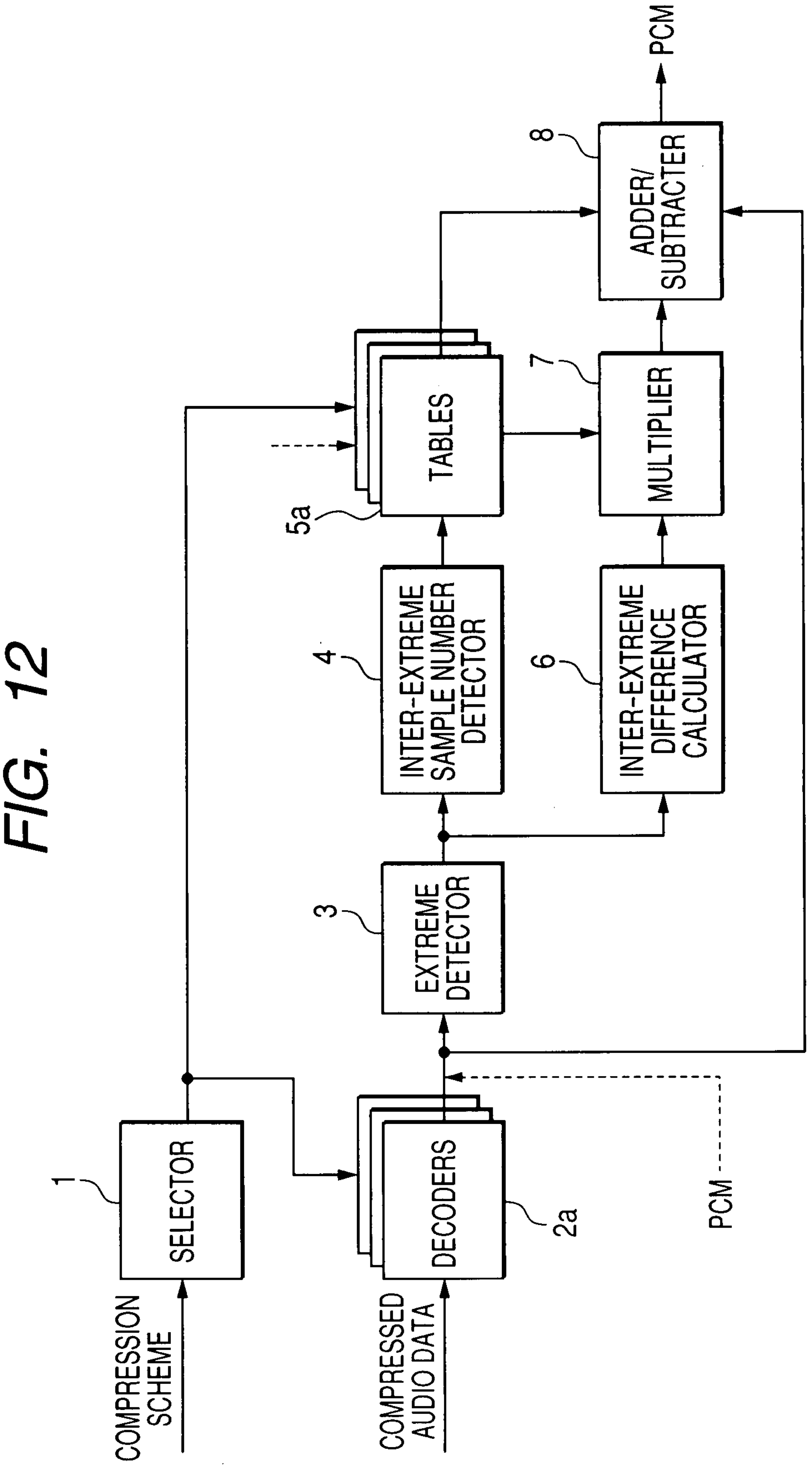
FIG. 12 is a block diagram of a digital-audio-signal processing apparatus according to a fourth embodiment of this invention.

FIG. 12 shows a digital-audio-signal processing apparatus according to a fourth embodiment of this invention. The apparatus of FIG. 12 is similar to the apparatus of FIG. 1 except for design changes mentioned hereafter.

The apparatus of FIG. 12 includes a selector 1, decoders 2*a*, and tables 5*a*. The decoders 2*a* replace the decoder 2 (see FIG. 1). The tables 5*a* replace the table 5 (see FIG. 1).

Compressed audio data results from signal compression based on a compression scheme selectable from different ones. The decoders 2*a* are designed in harmony with the different compression schemes, respectively. The tables 5*a* are also designed in harmony with the different compression schemes, respectively.

The selector 1 receives a signal representing which of the different compression schemes the compressed audio data relates to. The device 1 selects one from the decoders 2*a* and one from the tables 5*a* in response to the received signal. The selected decoder 2*a* and the selected table 5*a* are those in harmony with the compression scheme to which the compressed audio data relates. The selected decoder 2*a* and the selected table 5*a* are activated and used in the apparatus of FIG. 12. The other decoders and tables 2*a* and 5*a* are inactive and unused.

The selected decoder 2*a* expands the compressed audio data into a first PCM signal according to a predetermined expansion scheme inverse with respect to the compression scheme to which the compressed audio data relates. The selected decoder 2*a* applies the first PCM signal to the extreme detector 3 and the adder/subtractor 8.

The inter-extreme sample number detector 4 notifies the inter-extreme sample number to the selected table 5*a* so that a coefficient "a" and a correction sample number assigned to the inter-extreme sample number are read out from the selected table 5*a*. The read-out coefficient "α" is sent to the multiplier 7. The read-out correction sample number is sent to the adder/subtractor 8.

Figure 13:
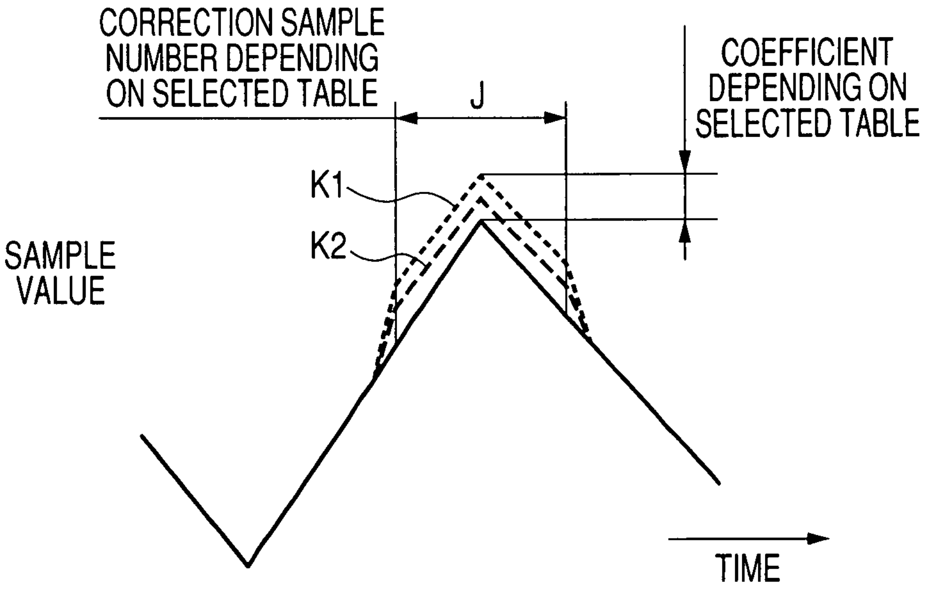
FIG. 13 is a time-domain diagram showing an example of a waveform formed by a sequence of sample values.

With reference to FIG. 13, the characters "K1" and "K2" denote partial correction-resultant waveforms centered at a maximum-representing sample. The partial correction-resultant waveform K1 is caused by one of the tables 5*a*. The partial correction-resultant waveform K2 is caused by another of the tables 5*a*. The read-out coefficient "α" and the read-out correction sample number depend on which of the tables 5*a* is selected.

A consideration is given to a recording medium which stores an analog audio signal recorded many years ago. Generally, the analog audio signal currently reproduced from the recording medium is considerably lower in audio quality than the analog audio signal occurring at the time of the recording. The currently-reproduced analog audio signal is converted into a PCM signal in a conventional way. Generally, an analog audio signal resulting from repetitively dubbing is considerably lower in audio quality than the original one. The analog audio signal is converted into a PCM signal in the conventional way. One of the above-indicated PCM signals may be inputted to the extreme detector 3. The tables 5*a* may be designed to compensate for different degrees of audio-quality degradation, respectively. One may be selected from the tables 5*a* in accordance with user's request. In this case, the user can select, from the tables 5*a*, one suited to sufficiently compensate for audio-quality degradation of a PCM signal to be processed.

Fifth Embodiment

Figure 14:
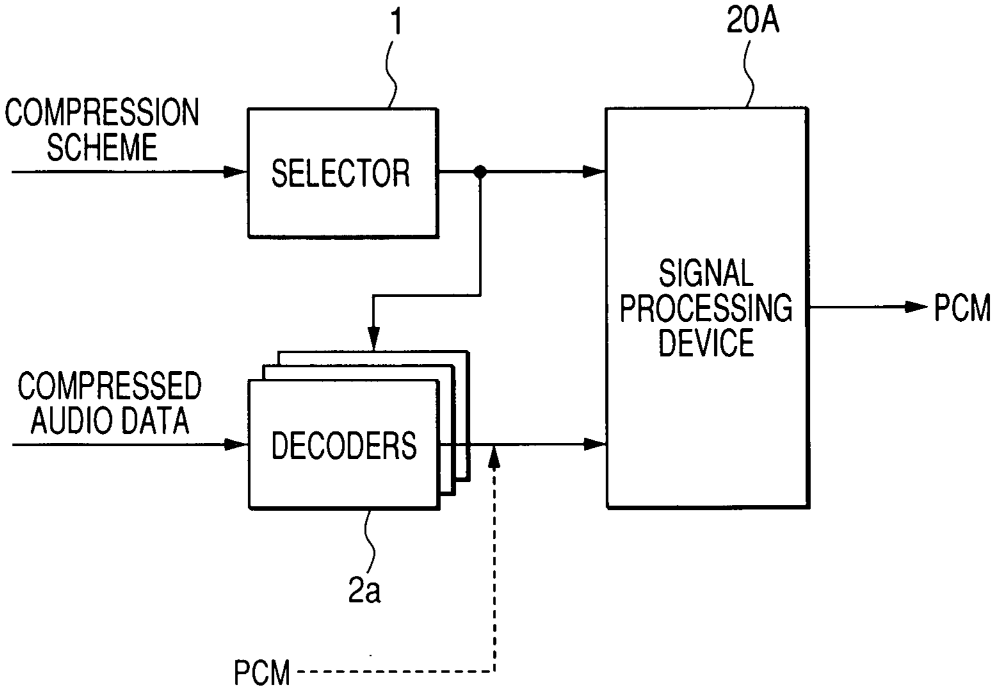
FIG. 14 is a block diagram of a digital-audio-signal processing apparatus according to a fifth embodiment of this invention.

FIG. 14 shows a digital-audio-signal processing apparatus according to a fifth embodiment of this invention. The apparatus of FIG. 14 is similar to the apparatus of FIG. 8 except for design changes mentioned hereafter.

The apparatus of FIG. 14 includes a selector 1, decoders 2*a*, and a signal processing device 20A. The selector 1 and the decoders 2*a* are similar to those in FIG. 12. The device 1 selects one from the decoders 2*a* as that in the apparatus of FIG. 12 does. The signal processing device 20A is basically similar to the signal processing device 20 in FIG. 8. Tables similar to the tables 5*a* in FIG. 12 are provided in a ROM or a RAM within the signal processing device 20A.

The signal processing device 20A receives an output signal from the selector 1 which depends on which of the different compression schemes the compressed audio data relates to. The signal processing device 20A receives the first PCM signal from selected one of the decoders 2*a*. The signal processing device 20A processes the first PCM signal into the second PCM signal in response to the output signal from the selector 1.

In a segment of a control program for the signal processing device 20A, a step 35 (see FIG. 9) selects one from the tables in response to the output signal of the selector 1. The selected table is that in harmony with the compression scheme to which the compressed audio data relates. The step 35 reads out, from the selected table, a coefficient "α" and a correction sample number assigned to the inter-extreme sample number given by a step 33 (see FIG. 9). The read-out coefficient "α" is used by a step 36 (see FIG. 9). The read-out correction sample number is used by a step 37 (see FIG. 9).

Sixth Embodiment

Figure 15:
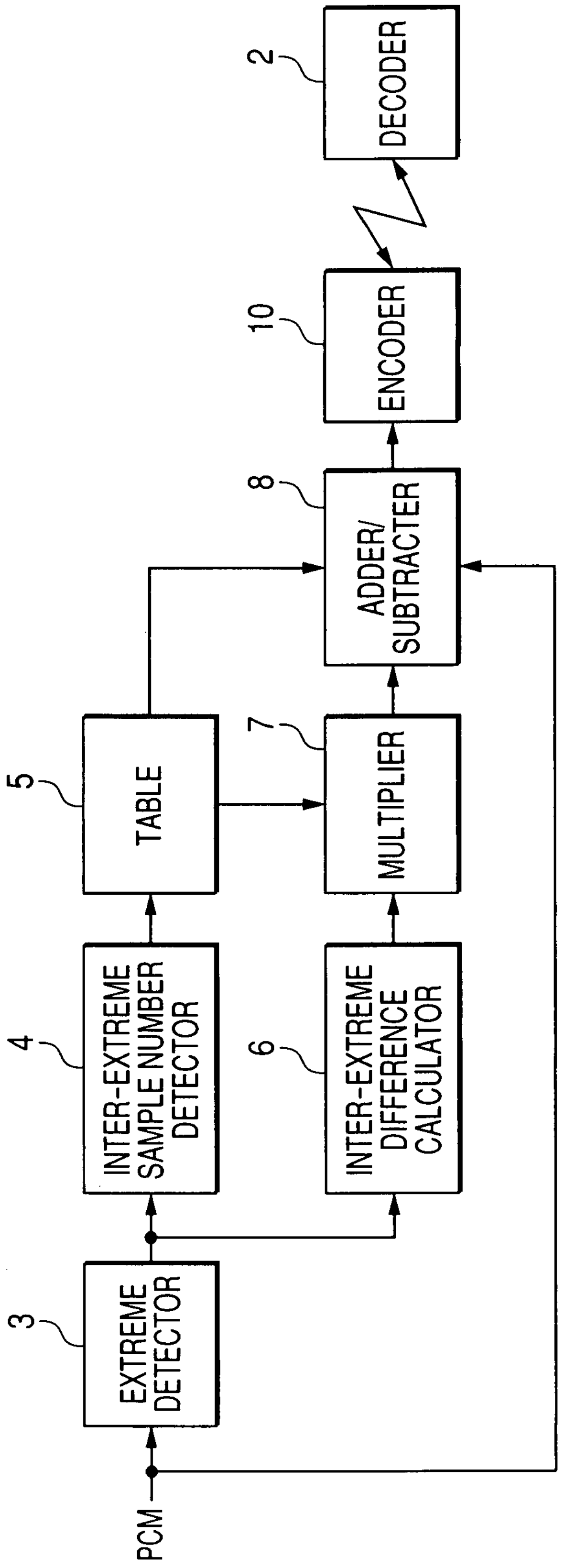
FIG. 15 is a block diagram of a digital-audio-signal processing apparatus according to a sixth embodiment of this invention.

FIG. 15 shows a digital-audio-signal processing apparatus according to a sixth embodiment of this invention. The apparatus of FIG. 15 is similar to the apparatus of FIG. 1 except for design changes mentioned hereafter.

The apparatus of FIG. 15 is provided in a transmitter side rather than a receiver side. The apparatus of FIG. 15 includes a combination of an extreme detector 3, an inter-extreme sample number detector 4, a table 5, an inter-extreme difference calculator 6, a multiplier 7, and an adder/subtractor 8 which are similar to those in FIG. 1. In addition, the apparatus of FIG. 15 includes an encoder 10 following the adder/subtractor 8.

A first PCM signal representative of audio information is applied to the extreme detector 3 and the adder/subtractor 8. The combination of the devices 3-8 processes the first PCM signal into a second PCM signal as that in FIG. 1 does. The signal processing by the combination of the devices 3-8 corresponds to pre-emphasis. The adder/subtractor 8 outputs the second PCM signal to the encoder 10. The encoder 10 compresses the second PCM signal into a compression-resultant signal. The transmitter side sends the compression-resultant signal toward the receiver side.

The signal compression by the encoder 10 causes audio-quality degradation which can be compensated for by the foregoing pre-emphasis. Therefore, the compression-resultant signal generated by the encoder 10 is relatively high in audio quality.

Specifically, the table 5 is designed to sufficiently compensate for the audio-quality degradation caused by the signal compression in the encoder 10. Accordingly, predetermined coefficients and predetermined correction sample numbers listed in the table 5 are chosen in view of a degree of the audio-quality degradation. Thus, the combination of the devices 3-8 implements the pre-emphasis which sufficiently compensates for the audio-quality degradation.

A decoder 2 in the receiver side receives the compression-resultant signal from the transmitter side. The decoder 2 expands the compression-resultant signal into an expansion-resultant signal. The operation of the decoder 2 is inverse with respect to the operation of the encoder 10.

It should be noted that the combination of the devices 3-8 may be replaced by a signal processing device 20 similar to that in FIG. 8.

Seventh Embodiment

A seventh embodiment of this invention is similar to one of the first to sixth embodiments thereof except for design changes mentioned hereafter.

Figure 17:
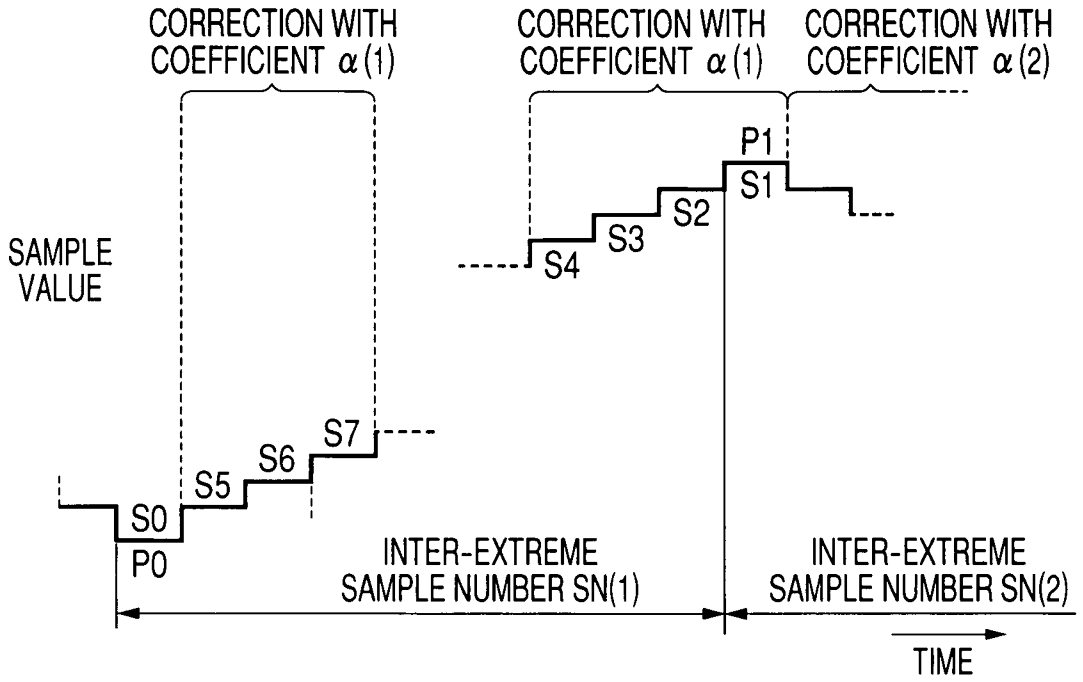

With reference to FIG. 17, there are a first extreme P0 and a second extreme P1 after the first extreme P0. The first and second extremes P0 and P1 correspond to samples S0 and S1, respectively. The number SN(1) of samples between the first and second extreme-representing samples S0 and S1 is detected. The detected inter-extreme sample number SN(1) is notified to the table so that a coefficient "α(1)" and a correction sample number CN(1) assigned to the detected inter-extreme sample number SN(1) are read out from the table. When the read-out correction sample number CN(1) is equal to 7, three samples S5, S6, and S7 immediately following the first extreme-representing sample S0, three samples S2, S3, and S4 immediately preceding the second extreme-representing sample S1, and the second extreme-representing sample S1 are selected and designated as objects to be corrected. All the designated samples S1, S2, S3, S4, S5, S6, and S7 are corrected in response to the corrective value depending on the current coefficient "α(1)".

It should be noted that the first extreme-representing sample S0, three samples S5, S6, and S7 immediately following the first extreme-representing sample S0, and three samples S2, S3, and S4 immediately preceding the second extreme-representing sample S1 may be selected and designated as objects to be corrected. In this case, the first extreme-representing sample S0, designated samples immediately preceding the first extreme-representing sample S0, and the samples S5, S6, and S7 immediately following the first extreme-representing sample S0 are corrected in response to the corrective value depending on the current coefficient "α(1)". Alternatively, all the designated samples S0, S2, S3, S4, S5, S6, and S7 may be corrected in response to the corrective value depending on the current coefficient "α(1)".

What is claimed is:

1. A method of processing a digital audio signal having a sequence of samples, the method comprising the steps of:

using an extreme detector for detecting every extreme value in an audio waveform represented by the digital audio signal, the extreme value being either a maximum value or a minimum value;

using an inter-extreme sample number detector for detecting a number of samples in time positions between time positions of two temporally-adjacent samples among samples representing respective detected extreme values to get a detected inter-extreme sample number;

using an inter-extreme difference calculator for calculating a difference between the detected extreme values represented by said two temporally-adjacent samples to get a calculated inter-extreme difference;

generating a corrective value in response to the detected inter-extreme sample number and the calculated inter-extreme difference, the generated corrective value being updated each time a new extreme value is detected;

designating ones among samples in response to the detected inter-extreme sample number as objects to be corrected, the designated samples including at least (1) a sample adjacently following the older of said two temporally-adjacent samples, (2) a sample adjacently preceding the newer of said two temporally-adjacent samples, and (3) a sample being one of said two temporally-adjacent samples; and correcting the designated samples in response to at least one of (1) the currently-generated corrective value, (2) the previously-generated corrective value, and (3) a generated corrective value next to the currently-generated corrective value.

2. A method as recited in claim 1, wherein the correcting is such that one of (1) the currently-generated corrective value, (2) the previously-generated corrective value, and (3) the generated corrective value next to the currently-generated corrective value is subtracted from a value represented by the sample adjacently following the older of said two temporally-adjacent samples and is subtracted from the detected extreme value represented by the older of said two temporally-adjacent samples and one of (1) the currently-generated corrective value, (2) the previously-generated corrective value, and (3) the generated corrective value next to the currently-generated corrective value is added to a value represented by the sample adjacently preceding the newer of said two temporally-adjacent samples and is added to the detected extreme value represented by the newer of said two temporally-adjacent samples when the detected extreme values represented by the newer and older of said two temporally-adjacent samples are a maximum value and a minimum value respectively, and that one of (1) the currently-generated corrective value, (2) the previously-generated corrective value, and (3) the generated corrective value next to the currently-generated corrective value is added to the value represented by the sample adjacently following the older of said two temporally-adjacent samples and is added to the detected extreme value represented by the older of said two temporally-adjacent samples and one of (1) the currently-generated corrective value, (2) the previously-generated corrective value, and (3) the generated corrective value next to the currently-generated corrective value is subtracted from the value represented by the sample adjacently preceding the newer of said two temporally-adjacent samples and is subtracted from the detected extreme value represented by the newer of said two temporally-adjacent samples when the detected extreme values represented by the newer and older of said two temporally-adjacent samples are a minimum value and a maximum value respectively.

3. A method as recited in claim 1, wherein the generated corrective value and the designated samples are selectable from candidate ones designed to compensate for different degrees of degradation in audio quality of the digital audio signal.

4. An apparatus for processing a digital audio signal having a sequence of samples, the apparatus comprising:

an extreme detector for detecting every extreme value in an audio waveform represented by the digital audio signal, the extreme value being either a maximum value or a minimum value;

an inter-extreme sample number detector for detecting a number of samples in time positions between time positions of two temporally-adjacent samples among samples representing respective detected extreme values to get a detected inter-extreme sample number;

an inter-extreme difference calculator for calculating a difference between the detected extreme values represented by said two temporally-adjacent samples to get a calculated inter-extreme difference;

means for generating a corrective value in response to the detected inter-extreme sample number and the calculated inter-extreme difference, the generated corrective value being updated each time a new extreme value is detected;

means for designating ones among samples in response to the detected inter-extreme sample number as objects to be corrected, the designated samples including at least (1) a sample adjacently following the older of said two temporally-adjacent samples, (2) a sample adjacently preceding the newer of said two temporally-adjacent samples, and (3) a sample being one of said two temporally-adjacent samples; and means for correcting the designated samples in response to at least one of (1) the currently-generated corrective value, (2) the previously-generated corrective value, and (3) a generated corrective value next to the currently-generated corrective value.

5. An apparatus as recited in claim 4, wherein the correcting is such that one of (1) the currently-generated corrective value, (2) the previously-generated corrective value, and (3) the generated corrective value next to the currently-generated corrective value is subtracted from a value represented by the sample adjacently following the older of said two temporally-adjacent samples and is subtracted from the detected extreme value represented by the older of said two temporally-adjacent samples and one of (1) the currently-generated corrective value, (2) the previously-generated corrective value, and (3) the generated corrective value next to the currently-generated corrective value is added to a value represented by the sample adjacently preceding the newer of said two temporally-adjacent samples and is added to the detected extreme value represented by the newer of said two temporally-adjacent samples when the detected extreme values represented by the newer and older of said two temporally-adjacent samples are a maximum value and a minimum value respectively, and that one of (1) the currently-generated corrective value, (2) the previously-generated corrective value, and (3) the generated corrective value next to the currently-generated corrective value is added to the value represented by the sample adjacently following the older of said two temporally-adjacent samples and is added to the detected extreme value represented by the older of said two temporally-adjacent samples and one of (1) the currently-generated corrective value, (2) the previously-generated corrective value, and (3) the generated corrective value next to the currently-generated corrective value is subtracted from the value of represented by the sample adjacently preceding the newer of said two temporally-adjacent samples and is subtracted from the detected extreme value represented by the newer of said two temporally-adjacent samples when the detected extreme values represented by the newer and older of said two temporally-adjacent samples are a minimum value and a maximum value respectively.

6. An apparatus as recited in claim 4, wherein the generated corrective value and the designated samples are selectable from candidate ones designed to compensate for different degrees of degradation in audio quality of the digital audio signal.

7. A non-transitory computer readable medium storing a computer program for processing a digital audio signal having a sequence of samples, the computer program comprising the steps of:

using an extreme detector for detecting every extreme value in an audio waveform represented by the digital audio signal, the extreme value being either a maximum value or a minimum value;

using an inter-extreme sample number detector for detecting a number of samples in time positions between time positions of two temporally-adjacent samples among samples representing respective detected extreme values to get a detected inter-extreme sample number;

using an inter-extreme difference calculator for calculating a difference between the detected extreme values represented by said two temporally-adjacent samples to get a calculated inter-extreme difference;

generating a corrective value in response to the detected inter-extreme sample number and the calculated inter-extreme difference, the generated corrective value being updated each time a new extreme value is detected;

designating ones among samples in response to the detected inter-extreme sample number as objects to be corrected, the designated samples including at least (1) a sample adjacently following the older of said two temporally-adjacent samples, (2) a sample adjacently preceding the newer of said two temporally-adjacent samples, and (3) a sample being one of said two temporally-adjacent samples; and correcting the designated samples in response to at least one of (1) the currently-generated corrective value, (2) the previously-generated corrective value, and (3) a generated corrective value next to the currently-generated corrective value.

8. A non-transitory computer readable medium as recited in claim 7, wherein the correcting is such that one of (1) the currently-generated corrective value, (2) the previously-generated corrective value, and (3) the generated corrective value next to the currently-generated corrective value is subtracted from a value represented by the sample adjacently following the older of said two temporally-adjacent samples and is subtracted from the detected extreme value represented by the older of said two temporally-adjacent samples and one of (1) the currently-generated corrective value, (2) the previously-generated corrective value, and (3) the generated corrective value next to the currently-generated corrective value is added to a value represented by the sample adjacently preceding the newer of said two temporally-adjacent samples and is added to the detected extreme value represented by the newer of said two temporally-adjacent samples when the detected extreme values represented by the newer and older of said two temporally-adjacent samples are a maximum value and a minimum value respectively, and that one of (1) the currently-generated corrective value, (2) the previously-generated corrective value, and (3) the generated corrective value next to the currently-generated corrective value is added to the value represented by the sample adjacently following the older of said two temporally-adjacent samples and is added to the detected extreme value represented by the older of said two temporally-adjacent samples and one of (1) the currently-generated corrective value, (2) the previously-generated corrective value, and (3) the generated corrective value next to the currently-generated corrective value is subtracted from the value represented by the sample adjacently preceding the newer of said two temporally-adjacent samples and is subtracted from the detected extreme value represented by the newer of said two temporally-adjacent samples when the detected extreme values represented by the newer and older of said two temporally-adjacent samples are a minimum value and a maximum value respectively.

9. A non-transitory computer readable medium as recited in claim 7, wherein the generated corrective value and the designated samples are selectable from candidate ones designed to compensate for different degrees of degradation in audio quality of the digital audio signal.

10. A method of pre-emphasizing a digital audio signal having a sequence of samples to generate a pre-emphasized digital audio signal before the pre-emphasized digital audio signal is compressed by an encoder, the pre-emphasizing being designed to compensate for audio quality degradation caused by the compression by the encoder, the method comprising the steps of:

using an extreme detector for detecting every extreme value in an audio waveform represented by the digital audio signal, the extreme value being either a maximum value or a minimum value;

using an inter-extreme sample number detector for detecting a number of samples in time positions between time positions of two temporally-adjacent samples among samples representing respective detected extreme values to get a detected inter-extreme sample number;

using an inter-extreme difference calculator for calculating a difference between the detected extreme values represented by said two temporally-adjacent samples to get a calculated inter-extreme difference;

generating a corrective value in response to the detected inter-extreme sample number and the calculated inter-extreme difference, the generated corrective value being updated each time a new extreme value is detected;

designating ones among samples in response to the detected inter-extreme sample number and the degree of the audio quality degradation as objects to be corrected, the designated samples including at least (1) a sample adjacently following the older of said two temporally-adjacent samples, (2) a sample adjacently preceding the newer of said two temporally-adjacent samples, and (3) a sample being one of said two temporally-adjacent samples; and correcting the designated samples in response to at least one of (1) the currently-generated corrective value, (2) the previously-generated corrective value, and (3) a generated corrective value next to the currently-generated corrective value.

11. A method as recited in claim 10, wherein the correcting is such that one of (1) the currently-generated corrective value, (2) the previously-generated corrective value, and (3) the generated corrective value next to the currently-generated corrective value is subtracted from a value represented by the sample adjacently following the older of said two temporally-adjacent samples and is subtracted from the detected extreme value represented by the older of said two temporally-adjacent samples and one of (1) the currently-generated corrective value, (2) the previously-generated corrective value, and (3) the generated corrective value next to the currently-generated corrective value is added to a value represented by the sample adjacently preceding the newer of said two temporally-adjacent samples and is added to the detected extreme value represented by the newer of said two temporally-adjacent samples when the detected extreme values represented by the newer and older of said two temporally-adjacent samples are a maximum value and a minimum value respectively, and that one of (1) the currently-generated corrective value, (2) the previously-generated corrective value, and (3) the generated corrective value next to the currently-generated corrective value is added to the value of represented by the sample adjacently following the older of said two temporally-adjacent samples and is added to the detected extreme value represented by the older of said two temporally-adjacent samples and one of (1) the currently-generated corrective value, (2) the previously-generated corrective value, and (3) the generated corrective value next to the currently-generated corrective value is subtracted from the value of represented by the sample adjacently preceding the newer of said two temporally-adjacent samples and is subtracted from the detected extreme value represented by the newer of said two temporally-adjacent samples when the detected extreme values represented by the newer and older of said two temporally-adjacent samples are a minimum value and a maximum value respectively.

12. A method as recited in claim 10, wherein the generated corrective value and the designated samples are selectable from candidate ones designed to compensate for different degrees of degradation in audio quality of the digital audio signal.

13. An apparatus for pre-emphasizing a digital audio signal having a sequence of samples to generate a pre-emphasized digital audio signal before the pre-emphasized digital audio signal is compressed by an encoder, the pre-emphasizing being designed to compensate for audio quality degradation caused by the compression by the encoder, the apparatus comprising:

an extreme detector for detecting every extreme value in an audio waveform represented by the digital audio signal, the extreme value being either a maximum value or a minimum value;

an inter-extreme sample number detector for detecting a number of samples in time positions between time positions of two temporally-adjacent samples among samples representing respective detected extreme values to get a detected inter-extreme sample number;

an inter-extreme difference calculator for calculating a difference between the detected extreme values represented by said two temporally-adjacent samples to get a calculated inter-extreme difference;

means for generating a corrective value in response to the detected inter-extreme sample number and the calculated inter-extreme difference, the generated corrective value being updated each time a new extreme value is detected;

means for designating ones among samples in response to the detected inter-extreme sample number and the degree of the audio quality degradation as objects to be corrected, the designated samples including at least (1) a sample adjacently following the older of said two temporally-adjacent samples, (2) a sample adjacently preceding the newer of said two temporally-adjacent samples, and (3) a sample being one of said two temporally-adjacent samples; and means for correcting the designated samples in response to at least one of (1) the currently-generated corrective value, (2) the previously-generated corrective value, and (3) a generated corrective value next to the currently-generated corrective value.

14. An apparatus as recited in claim 13, wherein the correcting is such that one of (1) the currently-generated corrective value, (2) the previously-generated corrective value, and (3) the generated corrective value next to the currently-generated corrective value is subtracted from a value represented by the sample adjacently following the older of said two temporally-adjacent samples and is subtracted from the detected extreme value represented by the older of said two temporally-adjacent samples and one of (1) the currently-generated corrective value, (2) the previously-generated corrective value, and (3) the generated corrective value next to the currently-generated corrective value is added to a value represented by the sample adjacently preceding the newer of said two temporally-adjacent samples and is added to the detected extreme value represented by the newer of said two temporally-adjacent samples when the detected extreme values represented by the newer and older of said two temporally-adjacent samples are a maximum value and a minimum value respectively, and that one of (1) the currently-generated corrective value, (2) the previously-generated corrective value, and (3) the generated corrective value next to the currently-generated corrective value is added to the value represented by the sample adjacently following the older of said two temporally-adjacent samples and is added to the detected extreme value represented by the older of said two temporally-adjacent samples and one of (1) the currently-generated corrective value, (2) the previously-generated corrective value, and (3) the generated corrective value next to the currently-generated corrective value is subtracted from the value of represented by the sample adjacently preceding the newer of said two temporally-adjacent samples and is subtracted from the detected extreme value represented by the newer of said two temporally-adjacent samples when the detected extreme values represented by the newer and older of said two temporally-adjacent samples are a minimum value and a maximum value respectively.

15. An apparatus as recited in claim 13, wherein the generated corrective value and the designated samples are selectable from candidate ones designed to compensate for different degrees of degradation in audio quality of the digital audio signal.

16. A non-transitory computer readable medium storing a computer program for pre-emphasizing a digital audio signal having a sequence of samples to generate a pre-emphasized digital audio signal before the pre-emphasized digital audio signal is compressed by an encoder, the pre-emphasizing being designed to compensate for audio quality degradation caused by the compression by the encoder, the computer program comprising the steps of:

using an extreme detector for detecting every extreme value in an audio waveform represented by the digital audio signal, the extreme value being either a maximum value or a minimum value;

using an inter-extreme sample number detector for detecting a number of samples in time positions between time positions of two temporally-adjacent samples among samples representing respective detected extreme values to get a detected inter-extreme sample number;

using an inter-extreme difference calculator for calculating a difference between the detected extreme values represented by said two temporally-adjacent samples to get a calculated inter-extreme difference;

generating a corrective value in response to the detected inter-extreme sample number and the calculated inter-extreme difference, the generated corrective value being updated each time a new extreme value is detected;

designating ones among samples in response to the detected inter-extreme sample number and the degree of the audio quality degradation as objects to be corrected, the designated samples including at least (1) a sample adjacently following the older of said two temporally-adjacent samples, (2) a sample adjacently preceding the newer of said two temporally-adjacent samples, and (3) a sample being one of said two temporally-adjacent samples; and correcting the designated samples in response to at least one of (1) the currently-generated corrective value, (2) the previously-generated corrective value, and (3) a generated corrective value next to the currently-generated corrective value.

17. A non-transitory computer readable medium as recited in claim 16, wherein the correcting is such that one of (1) the currently-generated corrective value, (2) the previously-generated corrective value, and (3) the generated corrective value next to the currently-generated corrective value is subtracted from a value represented by the sample adjacently following the the older of said two temporally-adjacent samples and is subtracted from the detected extreme value represented by the older of said two temporally-adjacent samples and one of (1) the currently-generated corrective value, (2) the previously-generated corrective value, and (3) the generated corrective value next to the currently-generated corrective value is added to a value represented by the sample adjacently preceding the newer of said two temporally-adjacent samples and is added to the detected extreme value represented by the newer of said two temporally-adjacent samples when the detected extreme values represented by the newer and older of said two temporally-adjacent samples are a maximum value and a minimum value respectively, and that one of (1) the currently-generated corrective value, (2) the previously-generated corrective value, and (3) the generated corrective value next to the currently-generated corrective value is added to the value represented by the sample adjacently following the older of said two temporally-adjacent samples and is added to the detected extreme value represented by the older of said two temporally-adjacent samples and one of (1) the currently-generated corrective value, (2) the previously-generated corrective value, and (3) the generated corrective value next to the currently-generated corrective value is subtracted from the value represented by the sample adjacently preceding the newer of said two temporally-adjacent samples and is subtracted from the detected extreme value represented by the newer of said two temporally-adjacent samples when the detected extreme values represented by the newer and older of said two temporally-adjacent samples are a minimum value and a maximum value respectively.

18. A non-transitory computer readable medium as recited in claim 16, wherein the generated corrective value and the designated samples are selectable from candidate ones designed to compensate for different degrees of degradation in audio quality of the digital audio signal.

19. A method of processing a digital audio signal having a sequence of samples, the method comprising the steps of:

using an extreme detector for detecting every extreme value in an audio waveform represented by the digital audio signal, the extreme value being either a maximum value or a minimum value;

repetitively detecting a local period of the audio waveform;

using an inter-extreme difference calculator for repetitively calculating a difference between two detected extreme values and thereby repetitively detecting a local amplitude of the audio waveform; and correcting a sample corresponding to the detected extreme value, a sample adjacently preceding the sample corresponding to the detected extreme value, and a sample adjacently following the sample corresponding to the detected extreme value in response to the detected local period and the detected local amplitude.

20. An apparatus for processing a digital audio signal having a sequence of samples, comprising:

an extreme detector for detecting every extreme value in an audio waveform represented by the digital audio signal, the extreme value being either a maximum value or a minimum value;

means for repetitively detecting a local period of the audio waveform;

an inter-extreme difference calculator for repetitively calculating a difference between two detected extreme values and thereby repetitively detecting a local amplitude of the audio waveform; and means for correcting a sample corresponding to the detected extreme value, a sample adjacently preceding the sample corresponding to the detected extreme value, and a sample adjacently following the sample corresponding to the detected extreme value in response to the detected local period and the detected local amplitude.

* * * * *